(12) United States Patent
Chen et al.

(10) Patent No.: US 12,361,914 B2
(45) Date of Patent: Jul. 15, 2025

(54) VERTICAL SYNCHRONIZATION SIGNAL-BASED CONTROL METHOD AND ELECTRONIC DEVICE

(71) Applicant: Huawei Technologies Co., Ltd., Shenzhen (CN)

(72) Inventors: Jian Chen, Shanghai (CN); Yu Li, Shanghai (CN); Tanqi Yu, Shanghai (CN); Wei Tan, Helsinki (FI); Yuehai Zhou, Shanghai (CN); Liang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 18/251,094

(22) PCT Filed: Sep. 30, 2021

(86) PCT No.: PCT/CN2021/122218
§ 371 (c)(1),
(2) Date: Apr. 28, 2023

(87) PCT Pub. No.: WO2022/089153
PCT Pub. Date: May 5, 2022

(65) Prior Publication Data
US 2023/0410767 A1 Dec. 21, 2023

(30) Foreign Application Priority Data
Oct. 31, 2020 (CN) .......................... 202011197544.3

(51) Int. Cl.
*G09G 5/14* (2006.01)
*G09G 3/36* (2006.01)

(52) U.S. Cl.
CPC ................ *G09G 5/14* (2013.01); *G09G 3/36* (2013.01); *G09G 2320/02* (2013.01); *G09G 2354/00* (2013.01); *G09G 2360/18* (2013.01)

(58) Field of Classification Search
CPC ........ G09G 5/14; G09G 3/36; G09G 2320/02; G09G 2354/00; G09G 2360/18;
(Continued)

(56) References Cited

U.S. PATENT DOCUMENTS

2009/0213925 A1    8/2009   Inagaki et al.
2018/0261145 A1*   9/2018   Peng ..................... G06F 1/3203
(Continued)

FOREIGN PATENT DOCUMENTS

| CN | 107220019 A | 9/2017 |
|---|---|---|
| CN | 110609645 A | 12/2019 |
| CN | 111367741 A | 7/2020 |

*Primary Examiner* — Jin Cheng Wang
(74) *Attorney, Agent, or Firm* — SLATER MATSIL, LLP

(57) ABSTRACT

A vertical synchronization signal-based control method. The method includes the electronic device draws a first layer of a first application in response to a first vertical synchronization signal, and buffers the first layer to a first buffer queue. The electronic device performs, in response to a second vertical synchronization signal, layer composition on the layer buffered in the first buffer queue, to obtain an image frame. The electronic device adjusts a signal period of the first vertical synchronization signal to first duration if a quantity of layers buffered in the first buffer queue is less than a first preset threshold, where the first duration is less than a signal period of the second vertical synchronization signal.

20 Claims, 20 Drawing Sheets

(58) Field of Classification Search
CPC .......... G09G 5/377; G09G 5/395; G09G 5/12; G09G 5/18; G09G 2340/0435; G09G 2340/12; G09G 2360/12; G06F 3/0416; G06F 3/14; G06F 8/5027; G06F 9/546; G06F 2209/5018; G06F 2209/545; G06F 2209/548

See application file for complete search history.

(56) References Cited

U.S. PATENT DOCUMENTS

| | | | |
|---|---|---|---|
| 2020/0104973 A1 | 4/2020 | Zhang et al. | |
| 2020/0105227 A1* | 4/2020 | Zhang | G06T 1/20 |
| 2021/0089119 A1* | 3/2021 | Riguer | G06F 3/013 |
| 2021/0203989 A1* | 7/2021 | Wang | H04N 19/172 |
| 2022/0139352 A1* | 5/2022 | Hu | G06T 11/60 |
| | | | 345/204 |
| 2022/0415282 A1* | 12/2022 | Li | G09G 5/006 |
| 2023/0116975 A1* | 4/2023 | Chen | G06F 9/451 |
| | | | 345/629 |
| 2023/0334746 A1* | 10/2023 | Zhang | G09G 5/18 |
| 2024/0021176 A1* | 1/2024 | Chen | G09G 5/377 |

* cited by examiner

VERTICAL SYNCHRONIZATION SIGNAL-BASED CONTROL METHOD AND ELECTRONIC DEVICE

CROSS-REFERENCE TO RELATED APPLICATIONS

This application is a national stage of International Application No. PCT/CN2021/122218, filed on Sep. 30, 2021, which claims priority to Chinese Patent Application No. 202011197544.3, filed on Oct. 31, 2020. Both of the aforementioned applications are hereby incorporated by reference in their entireties.

TECHNICAL FIELD

Embodiments of this application relate to the field of image processing and display technologies, and in particular, to a vertical synchronization signal-based control method and an electronic device.

BACKGROUND

With development of electronic technologies, performance of various electronic devices (such as mobile phones) is getting better. Consumers are also increasingly demanding on human-computer interaction performance of electronic products. Visual continuity of a displayed image of an electronic device is important human-computer interaction performance for a user.

A prerequisite for ensuring continuity of displaying the image by the electronic device is that no frame is lost in the displayed image of the electronic device. High frame rate display of the electronic device is accordingly a development trend. For example, a frame rate of the electronic device increases from 60 Hertz (Hz) to 90 Hz, and then to 120 Hz. However, a higher frame rate of the electronic device indicates a higher probability that a frame loss occurs. As a result, displayed content of the electronic device is discontinuous, and user experience is affected. Therefore, when the electronic device displays an image at a high frame rate, how to reduce or even avoid a frame loss to ensure smoothness of the image displayed by the electronic device is an urgent problem to be resolved.

SUMMARY

Embodiments of this application provide a vertical synchronization signal-based control method and an electronic device, to reduce a probability that a frame loss occurs when the electronic device displays an image, and ensure smoothness of displaying an image on a display, thereby improving visual experience of a user.

According to a first aspect, this application provides a vertical synchronization signal-based control method, and the method is applied to an electronic device. The method includes: The electronic device draws a first layer in response to a first vertical synchronization signal, and buffers the first layer to a first buffer queue. The electronic device performs, in response to a second vertical synchronization signal, layer composition on the layer buffered in the first buffer queue, to obtain an image frame. The electronic device adjusts a signal period of the first vertical synchronization signal to first duration if a quantity of layers buffered in the first buffer queue is less than a first preset threshold, where the first duration is less than a signal period of the second vertical synchronization signal.

When the quantity of layers buffered in the first buffer queue is less than the first preset threshold, it indicates that frame data buffered in the first buffer queue is insufficient, and a frame loss phenomenon easily occurs when the electronic device displays an image. A reason why the frame loss phenomenon occurs when the electronic device displays an image is that a consumer (for example, a composition thread) cannot read frame data from the first buffer queue after a second vertical synchronization signal (for example, VSYNC_SF) arrives. In this case, if the consumer (for example, the composition thread) can read frame data from the first buffer queue after a VSYNC_SF signal arrives, the frame loss phenomenon does not occur when the electronic device displays an image, where SF is surface flinger.

In this application, if the quantity of layers buffered in the first buffer queue is less than the first preset threshold, the electronic device may adjust the signal period of the first vertical synchronization signal to the first duration. The first duration is less than the signal period of the second vertical synchronization signal. Therefore, after the electronic device adjusts the signal period of the first vertical synchronization signal to the first duration, the signal period of the first vertical synchronization signal is less than the signal period of the second vertical synchronization signal. In other words, a production period of a producer is less than a consumption period of the consumer. In this way, within same duration, a quantity of frame data produced by the producer is greater than a quantity of frame data consumed by the consumer, so that a production rate of the producer (namely, a UI thread and a render thread) is greater than a consumption rate of the consumer (namely, the composition thread). In this way, when the VSYNC_SF signal arrives, the frame data (namely, a layer) is buffered in the first buffer queue, and the frame loss phenomenon does not occur when the electronic device displays an image.

By using the foregoing solution, a probability that a frame loss occurs when the electronic device displays an image can be reduced without increasing power consumption of the electronic device, and smoothness of displaying an image on a display can be ensured.

In a possible design manner of the first aspect, in response to switching from a first application to a foreground application, the electronic device adjusts the signal period of the first vertical synchronization signal to the first duration if the quantity of layers buffered in the first buffer queue is less than the first preset threshold.

The first buffer queue is allocated to the first application. The first buffer queue is applied for by the render (Render) thread of the electronic device, and is allocated to the first application. The electronic device may separately allocate a buffer queue to each application. The foreground application is an application corresponding to an interface currently displayed on the display of the electronic device.

It should be understood that, when the first application is switched to the foreground application, an application interface of the first application is displayed on the display of the electronic device, and is visible to a user. If the frame loss phenomenon occurs when the electronic device performs layer drawing, layer rendering, and image frame composition and display on the first application, smoothness of displaying an image on the display is affected, and user experience is affected. Therefore, when the first application is switched to the foreground application, the electronic device may perform the foregoing method to adjust a signal period of a VSYNC_APP signal, to reduce the probability that the frame loss occurs when the electronic device displays an image.

In another possible design manner of the first aspect, after the electronic device adjusts the signal period of the VSYNC_APP signal to the first duration, the probability that the frame loss occurs when the electronic device displays an image cannot be reduced. In this case, if the quantity of layers buffered in the first buffer queue is less than a second preset threshold, the electronic device may continue to decrease the signal period of the VSYNC_APP signal, to reduce the probability that the frame loss occurs when the electronic device displays an image.

Specifically, the method in this application may further include: If the quantity of layers buffered in the first buffer queue is less than the second preset threshold, the electronic device adjusts the signal period of the first vertical synchronization signal to second duration. The second preset threshold is less than the first preset threshold, and the second duration is less than the first duration.

In this application, when the quantity of layers buffered in the first buffer queue is less than the second preset threshold, the electronic device may further decrease the signal period of the VSYNC_APP signal, to reduce the probability that the frame loss occurs when the electronic device displays an image, and ensure smoothness of displaying an image on the display.

In another possible design manner of the first aspect, to avoid that the first buffer queue cannot buffer frame data produced by the producer because the production rate is relatively high, when the quantity of layers buffered in the first buffer queue is greater than a third preset threshold, the electronic device may further adjust the signal period of the first vertical synchronization signal (namely, the VSYNC_APP signal), so that the signal period of the first vertical synchronization signal is equal to the signal period of the second vertical synchronization signal. The third preset threshold is greater than or equal to the first preset threshold.

In this application, after sufficient frame data is buffered in the first buffer queue, the electronic device may adjust the signal period of the first vertical synchronization signal, so that the signal period of the first vertical synchronization signal is equal to the signal period of the second vertical synchronization signal. In this way, a problem that the first buffer queue cannot buffer the frame data produced by the UI thread and the render thread (namely, the producer) can be avoided.

In another possible design manner of the first aspect, if the foreground application of the electronic device changes, the electronic device may be triggered to perform the foregoing method, to readjust the signal period of the VSYNC_APP signal, so as to reduce the probability that the frame loss occurs when the electronic device displays an image. Specifically, in response to switching the foreground application from the first application to a second application, the electronic device may adjust the signal period of the VSYNC_APP signal to third duration.

In another possible design manner of the first aspect, that a quantity of layers buffered in the first buffer queue is less than a first preset threshold specifically includes: Before performing layer composition on a frame of layer at a queue head in the first buffer queue in response to the second vertical synchronization signal, the electronic device reads the quantity of layers buffered in the first buffer queue, and the read quantity is less than the first preset threshold. For example, the first preset threshold is equal to 2.

It may be understood that before the frame data is dequeued from the first buffer queue, the quantity of layers buffered in the first buffer queue is less than 2. In this case, after the frame data is dequeued from the first buffer queue, the quantity of layers buffered in the first buffer queue is less than 1. In other words, the quantity of layers buffered in the first buffer queue is 0. In this case, after a second vertical synchronization signal (for example, VSYNC_SF) arrives, the frame data cannot be read from the first buffer queue, and the frame loss phenomenon occurs when the electronic device displays an image.

In another possible design manner of the first aspect, that a quantity of layers buffered in the first buffer queue is less than a first preset threshold specifically includes: After performing layer composition on a frame of layer at a queue head in the first buffer queue in response to the second vertical synchronization signal, the electronic device reads the quantity of layers buffered in the first buffer queue, and the read quantity is less than the first preset threshold. For example, the first preset threshold is equal to 1.

It may be understood that, after the frame data is dequeued from the first buffer queue, if the quantity of layers buffered in the first buffer queue is less than 1, it indicates that the quantity of layers buffered in the first buffer queue is 0. In this case, after a second vertical synchronization signal (for example, VSYNC_SF) arrives, the frame data cannot be read from the first buffer queue, and the frame loss phenomenon occurs when the electronic device displays an image.

In another possible design manner of the first aspect, the method may further include: If the quantity of layers buffered in the first buffer queue is greater than a third preset threshold, the electronic device adjusts the signal period of the first vertical synchronization signal, so that the signal period of the first vertical synchronization signal is equal to the signal period of the second vertical synchronization signal. The third preset threshold is greater than or equal to the first preset threshold.

In another possible design manner of the first aspect, that the quantity of layers buffered in the first buffer queue is greater than a third preset threshold specifically includes: Before performing layer composition on a frame of layer at a queue head in the first buffer queue in response to the second vertical synchronization signal, the electronic device reads the quantity of layers buffered in the first buffer queue, and the read quantity is greater than the third preset threshold. For example, the third preset threshold is equal to 1.

It may be understood that before the frame data is dequeued from the first buffer queue, if the quantity of layers buffered in the first buffer queue is greater than 1, it indicates that the quantity of layers buffered in the first buffer queue is at least 2. In this case, after the frame data is dequeued from the first buffer queue, the quantity of layers buffered in the first buffer queue is at least 1. In this case, after a second vertical synchronization signal (for example, VSYNC_SF) arrives, the frame data can be read from the first buffer queue, and the frame loss phenomenon does not occur when the electronic device displays an image.

In another possible design manner of the first aspect, that the quantity of layers buffered in the first buffer queue is greater than a third preset threshold specifically includes: After performing layer composition on a frame of layer at a queue head in the first buffer queue in response to the second vertical synchronization signal, the electronic device reads the quantity of layers buffered in the first buffer queue, and the read quantity is greater than the third preset threshold. For example, the third preset threshold is equal to 0.

It may be understood that, after the frame data is dequeued from the first buffer queue, if the quantity of layers buffered in the first buffer queue is greater than 0, it indicates that the quantity of layers buffered in the first buffer queue is at least 1. In this case, after a second vertical synchronization signal (for example, VSYNC_SF) arrives, the frame data can be read from the first buffer queue, and the frame loss phenomenon does not occur when the electronic device displays an image.

In another possible design manner of the first aspect, that the electronic device adjusts a signal period of the first vertical synchronization signal to first duration includes: The electronic device decreases the signal period of the first vertical synchronization signal by ΔT, so that the signal period of the first vertical synchronization signal is equal to the first duration, where the first duration is less than the signal period of the second vertical synchronization signal.

In another implementation, ΔT (for example, ΔT1) is fixed duration pre-configured in the electronic device. In another implementation, ΔT is determined based on a screen refresh rate of the electronic device. A higher screen refresh rate indicates smaller ΔT, and a lower screen refresh rate indicates larger ΔT. In another implementation, ΔT is determined based on a preset quantity K set by the user, where the preset quantity K indicates that the user expects the electronic device to resolve a frame loss of one frame after K frames, and $\Delta T = T_S/(K+1)$. $T_S$ is a reciprocal of a screen refresh rate of the electronic device.

In another implementation, ΔT is determined based on a difference between the signal period of the second vertical synchronization signal and a first drawing frame length of a first statistical period, the first drawing frame length is duration required by the electronic device to draw a layer, and ΔT is less than or equal to the difference.

According to a second aspect, this application provides an electronic device. The electronic device includes a display, a memory, and one or more processors. The display and the memory are coupled to the processor. The memory is configured to store computer program code, the computer program code includes computer instructions, and when the processor executes the computer instructions, the electronic device performs the method according to any one of the first aspect and the possible design manners of the first aspect.

According to a third aspect, this application provides a chip system. The chip system is applied to an electronic device including a display. The chip system includes one or more interface circuits and one or more processors. The interface circuit and the processor are interconnected by using a line. The interface circuit is configured to receive a signal from a memory of the electronic device, and send the signal to the processor, where the signal includes computer instructions stored in the memory. When the processor executes the computer instructions, the electronic device performs the method according to any one of the first aspect and the possible design manners of the first aspect.

According to a fourth aspect, this application provides a computer storage medium, including computer instructions. When the computer instructions are run on an electronic device, the electronic device is enabled to perform the method according to any one of the first aspect and the possible design manners of the first aspect.

According to a fifth aspect, this application provides a computer program product. When the computer program product runs on a computer, the computer is enabled to perform the method according to any one of the first aspect and the possible design manners of the first aspect.

It may be understood that for beneficial effects that can be achieved by the electronic device according to the second aspect, the chip system according to the third aspect, the computer storage medium according to the fourth aspect, and the computer program product according to the fifth aspect, refer to the beneficial effects in any one of the first aspect and the possible design manners of the first aspect. Details are not described herein again.

DETAILED DESCRIPTION OF ILLUSTRATIVE EMBODIMENTS

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

Embodiments of this application provide a vertical synchronization signal-based control method. The method may be applied to an electronic device including a display (for example, a touchscreen). According to the method, a probability that a frame loss occurs when an electronic device displays an image can be reduced, and smoothness of displaying an image on a display can be ensured, thereby improving visual experience of a user.

For example, the electronic device may be a device including a display (for example, a touchscreen), such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not particularly limited in embodiments of this application.

The following describes implementations of embodiments of this application in detail with reference to accompanying drawings.

Figure 1:
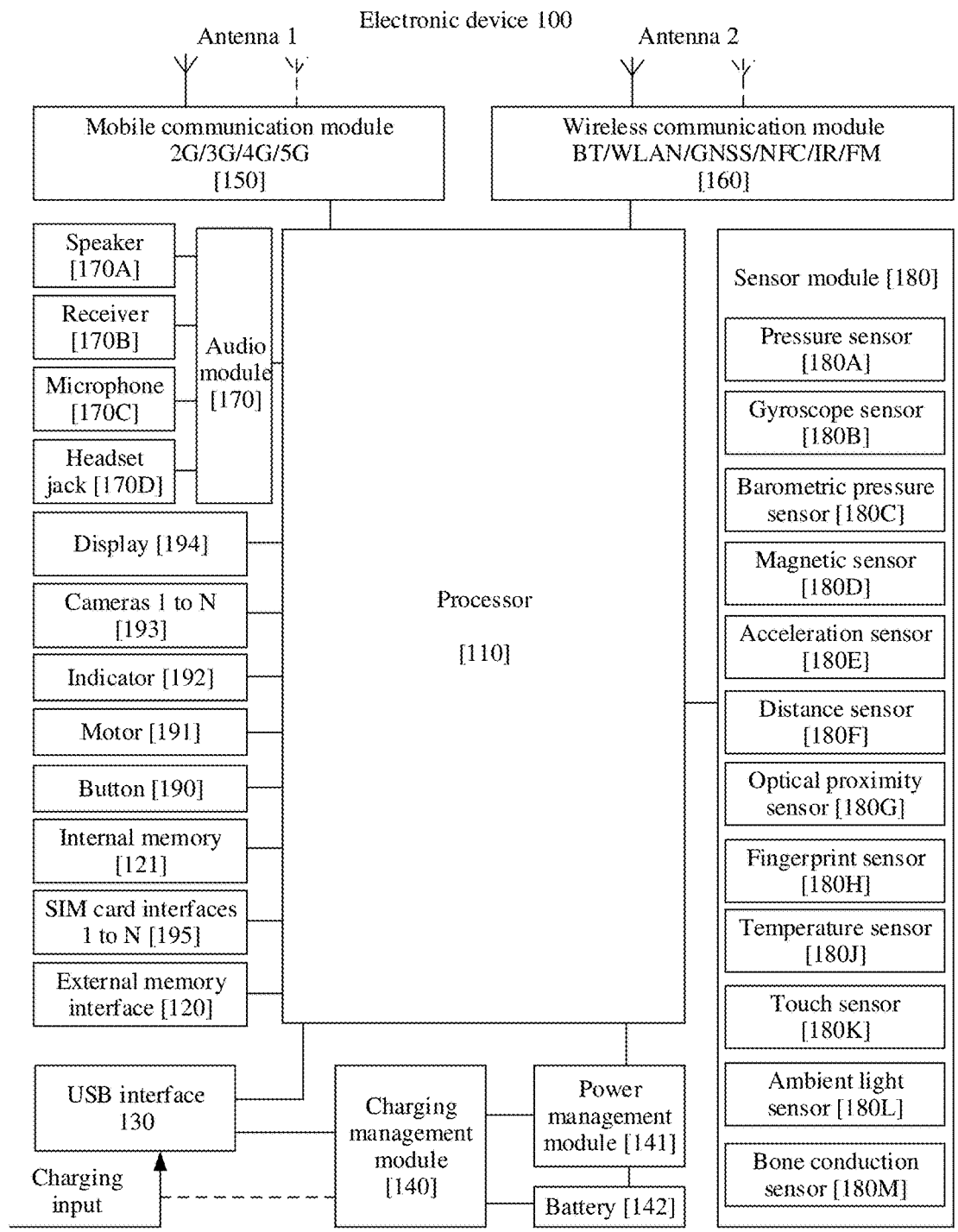
FIG. 1 is a schematic diagram of a hardware structure of an electronic device according to an embodiment of this application.

FIG. 1 is a schematic diagram of a structure of an electronic device 100 according to an embodiment of this application. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 293, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely an example for description, and constitutes no limitation on the structure of the electronic device 100. In some other embodiments, the electronic device 100 may alternatively use an interface connection manner different from that in the foregoing embodiment, or use a combination of a plurality of interface connection manners.

The charging management module 140 is configured to receive a charging input from the charger. The charging management module 140 supplies power to the electronic device by using the power management module 141 while charging the battery 142.

The power management module 141 is configured to connect to the battery 142 and the charging management module 140 to the processor 110. The power management module 141 receives an input from the battery 142 and/or the charging management module 140, and supplies power to the processor 110, the internal memory 121, an external memory, the display 194, the camera 293, the wireless communication module 160, and the like. In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna in a wireless local area network.

The mobile communication module 150 may provide a solution that is applied to the electronic device 100 and that includes wireless communication technologies such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

The display 194 in this embodiment of this application may be a touchscreen. In other words, the touch sensor 180K is integrated into the display 194. The touch sensor 180K may also be referred to as a "touch panel". To be specific, the display 194 may include a display panel and a touch panel, and the touch sensor 180K and the display 194 form a touchscreen, which is also referred to as a "touch screen". The touch sensor 180K is configured to detect a touch operation performed on or near the touch sensor. After the touch sensor 180K detects the touch operation, a driver (for example, a TP driver) at a kernel layer may transfer the touch operation to an upper layer, to determine a touch event type. A visual output related to the touch operation may be provided on the display 194. In some other embodiments, the touch sensor 180K may alternatively be disposed on a surface of the electronic device 100 at a location different from that of the display 194.

The electronic device 100 may implement a photographing function through the ISP, the camera 293, the video codec, the GPU, the display 194, the application processor, and the like. The ISP is configured to process data fed back by the camera 293. The camera 293 is configured to capture a static image or a video. The digital signal processor is configured to process a digital signal, and may process another digital signal in addition to the digital image signal. The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented through the NPU, for example, image recognition, facial recognition, voice recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card. The internal memory 121 may be configured to store computer-executable program code. The executable program code includes instructions. The processor 110 runs the instructions stored in the internal memory 121 to perform various function applications of the electronic device 100 and process data. For example, in this embodiment of this application, the processor 110 may execute the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a non-volatile memory, for example, at least one magnetic disk storage device, a flash memory device, a universal flash storage (universal flash storage, UFS), or the like.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. The speaker 170A, also referred to as a "horn", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal. The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, for example, a resistive pressure sensor, an inductive pressure sensor, a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed at a same touch position but have different touch operation intensity may correspond to different operation instructions. In this embodiment of this application, the electronic device 100 may obtain pressing force of a touch operation of a user by using the pressure sensor 180A.

The button 190 includes a power button, a volume button, and the like. The button 190 may be a mechanical button or a touch button. The electronic device 100 may receive a key input, and generate a key signal input related to a user setting and function control of the electronic device 100. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like.

For ease of understanding, an embodiment of this application herein describes vertical synchronization signals in a technology, for example, a vertical synchronization signal 1, a vertical synchronization signal 2, and a vertical synchronization signal 3.

Vertical synchronization signal 1: for example, a VSYNC_APP signal. The vertical synchronization signal 1 may be used to trigger drawing of one or more layers, and render the drawn layers. To be specific, the vertical synchronization signal 1 may be used to trigger a UI thread to draw one or more layers, and a render thread to render the one or more layers drawn by the UI thread. The vertical synchronization signal 1 (for example, the VSYNC_APP signal) is a first vertical synchronization signal.

Vertical synchronization signal 2: for example, a VSYNC_SF signal. The vertical synchronization signal 2 may be used to trigger layer composition on one or more rendered layers to obtain an image frame. To be specific, the vertical synchronization signal 2 may be used to trigger a composition thread to perform layer composition on one or more layers rendered by a render thread to obtain an image frame. The vertical synchronization signal 2 (for example, the VSYNC_SF signal) is a second vertical synchronization signal.

Vertical synchronization signal 3: for example, an HW_VSYNC signal. The vertical synchronization signal 3 may be used to trigger hardware to refresh a displayed image frame.

The vertical synchronization signal 3 is a hardware signal triggered by a display driver of an electronic device. In this embodiment of this application, a signal period T3 of the vertical synchronization signal 3 (for example, HW_VSYNC) is determined based on a screen refresh rate of the display of the electronic device. Specifically, the signal period T3 of the vertical synchronization signal 3 is a reciprocal of the screen refresh rate of the display (such as an LCD or an OLED) of the electronic device. The screen refresh rate of the electronic device may be the same as a frame rate of the electronic device. A high frame rate of the electronic device is a high screen refresh rate.

For example, the screen refresh rate and the frame rate of the display of the electronic device each may be any value such as 60 Hertz (Hz), 70 Hz, 75 Hz, 80 Hz, 90 Hz, or 120 Hz. For example, if the frame rate is 60 Hz, the signal period of the vertical synchronization signal 3 is 1/60=0.01667 seconds (s)=16.667 milliseconds (ms). For example, if the frame rate is 90 Hz, the signal period of the vertical synchronization signal 3 is 1/90=0.01111 seconds (s)=11.11 milliseconds (ms). It should be noted that the electronic device may support a plurality of different frame rates. The frame rate of the electronic device may be switched between the foregoing different frame rates. The frame rate in this embodiment of this application is a frame rate currently used by the electronic device. In other words, the signal period of the vertical synchronization signal 3 is a reciprocal of the frame rate currently used by the electronic device.

Figure 2:
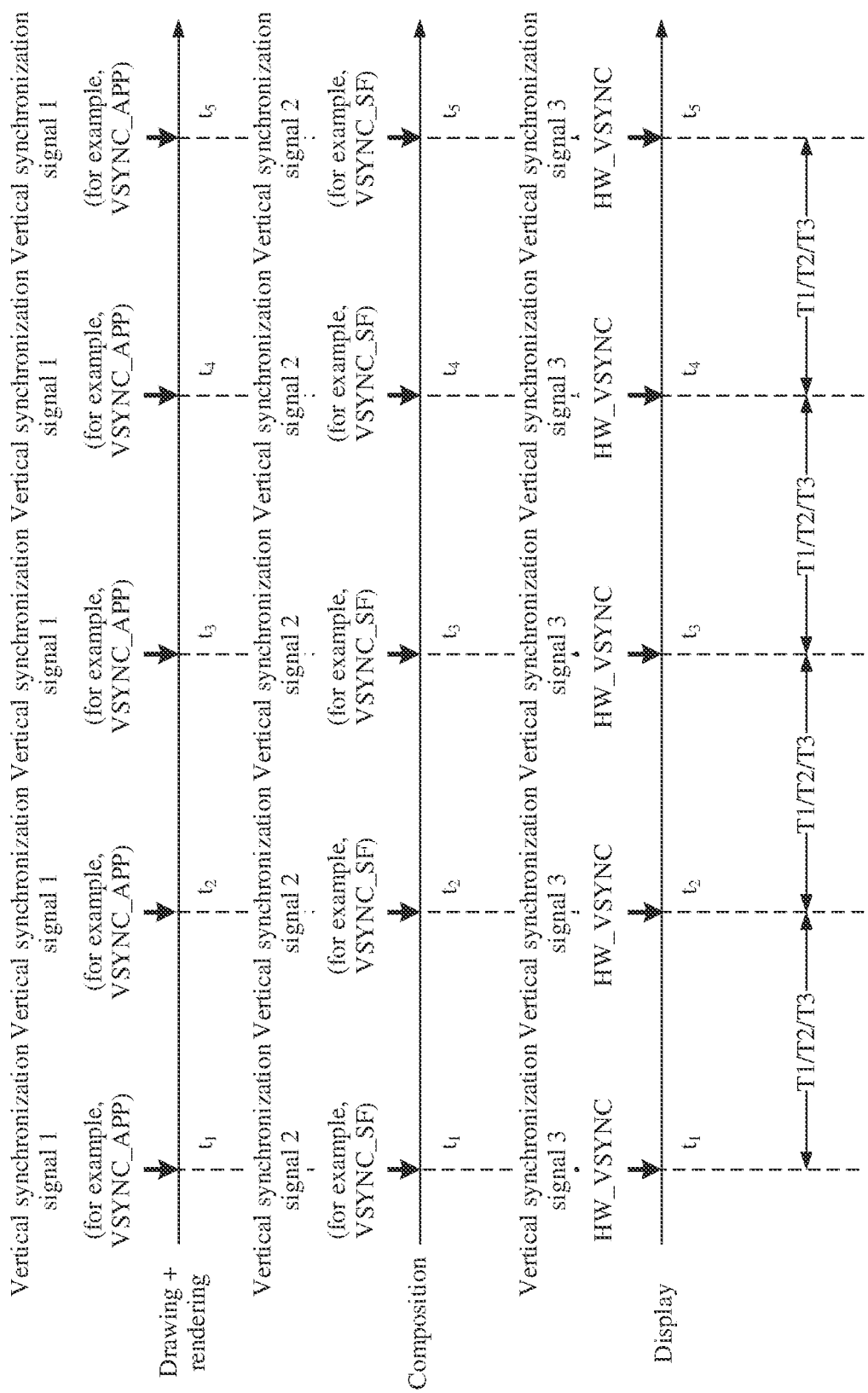
FIG. 2 is a schematic diagram of a vertical synchronization signal according to an embodiment of this application.

It should be noted that the vertical synchronization signal 3 in this embodiment of this application is a periodic discrete signal. For example, as shown in FIG. 2, there is one vertical synchronization signal 3 triggered by a hardware driver at an interval of one signal period. The vertical synchronization signal 1 and the vertical synchronization signal 2 are generated based on the vertical synchronization signal 3. In other words, the vertical synchronization signal 3 may be a signal source of the vertical synchronization signal 1 and the vertical synchronization signal 2. Alternatively, the vertical synchronization signal 1 and the vertical synchronization signal 2 are synchronized with the vertical synchronization signal 3. Therefore, generally, signal periods of the vertical synchronization signal 1 and the vertical synchronization signal 2 are the same as the signal period of the vertical synchronization signal 3, and phases are consistent. For example, as shown in FIG. 2, a signal period T1 of the vertical synchronization signal 1 and a signal period T2 of the vertical synchronization signal 2 are the same as the signal period T3 of the vertical synchronization signal 3.

In addition, as shown in FIG. 2, phases of the vertical synchronization signal 1 and the vertical synchronization signal 2 are consistent with a phase of the vertical synchronization signal 3. It may be understood that, in an actual implementation process, a phase error may exist between the vertical synchronization signal 1, the vertical synchronization signal 2, and the vertical synchronization signal 3 due to various factors (such as processing performance). It should be noted that, when the method in embodiments of this application is understood, the phase error is ignored.

In conclusion, the vertical synchronization signal 1, the vertical synchronization signal 2, and the vertical synchronization signal 3 are periodic discrete signals. For example, as shown in FIG. 2, there is one vertical synchronization signal 1 at an interval of one signal period T1, one vertical synchronization signal 2 at an interval of one signal period T2, and one vertical synchronization signal 3 at an interval of one signal period T3. The signal periods of the vertical synchronization signal 1, the vertical synchronization signal 2, and the vertical synchronization signal 3 may all be referred to as a synchronization period $T_Z$, where $T1=T2=T3=T_Z$. In other words, the synchronization period in this embodiment of this application is a reciprocal of the frame rate of the electronic device.

It should be noted that names of vertical synchronization signals may vary in different systems or architectures. For example, in some systems or architectures, a name of the vertical synchronization signal (namely, the vertical synchronization signal 1) used to trigger drawing of one or more layers may not be VSYNC_APP. However, regardless of the name of the vertical synchronization signal, provided that the vertical synchronization signal has a similar function and complies with the technical idea of the method provided in embodiments of this application, the vertical synchronization signal shall fall within the protection scope of this application.

Figure 3:
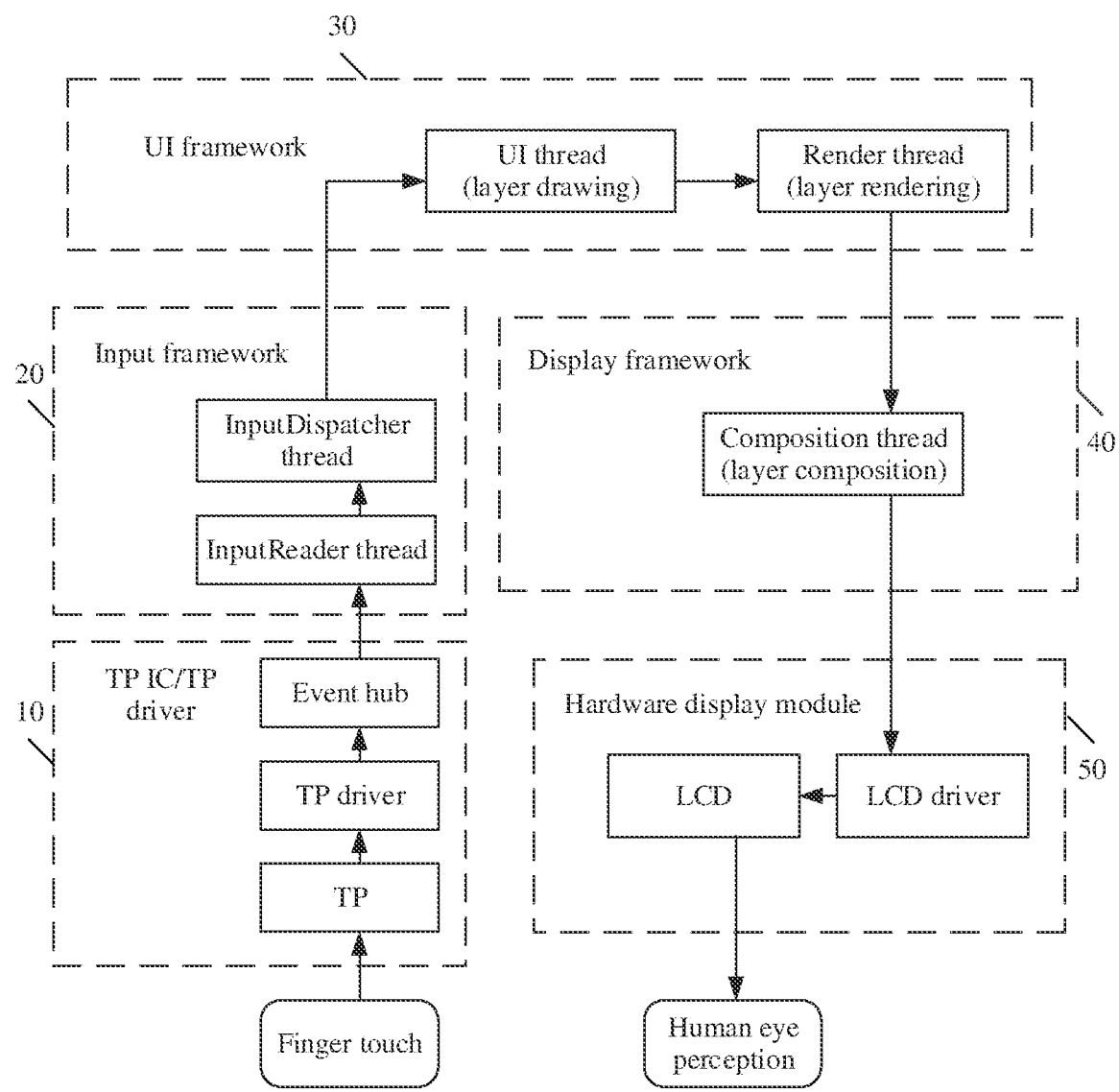
FIG. 3 is a schematic flowchart of software processing in which an electronic device displays an image in response to a touch operation according to an embodiment of this application.

For ease of understanding, with reference to FIG. 3, in this embodiment of this application, a software processing procedure of an electronic device in a process from "inputting a touch operation by a user finger on a touchscreen" to "displaying an image corresponding to the touch operation on the touchscreen" is described herein by using an example in which the foregoing display is the touchscreen and an operation of the user on the display is the touch operation.

As shown in FIG. 3, the electronic device may include a touch panel (touch panel, TP)/TP driver (Driver) 10, an input framework (Input Framework) 20, a UI framework (UI Framework) 30, a display framework (Display Framework) 40, and a hardware display module 50.

As shown in FIG. 3, the software processing procedure of the electronic device may include the following step (1) to step (5). Step (1): After a TP in the TP IC/TP driver 10 collects a touch operation performed by a user finger on the TP of the electronic device, the TP driver reports a corresponding touch event to an event hub. Step (2): An input reader thread in the input framework 20 may read the touch event from the event hub, and then send the touch event to an input dispatcher thread. The input dispatcher thread uploads the touch event to a UI thread in the UI framework 30. Step (3): The UI thread (such as Do Frame) in the UI framework 30 draws one or more layers corresponding to the touch event, and a render (Render) thread (such as Draw Frame) renders the one or more layers. Step (4): A composition thread (Surface Flinger) in the display framework 40 performs layer composition on one or more drawn layers (namely, one or more rendered layers) to obtain an image frame. Step (5): A liquid crystal display (Liquid Crystal Display, LCD) driver of the hardware display module 50 may receive the composed image frame, and an LCD displays the composed image frame. After the LCD displays the image frame, an image displayed on the LCD can be perceived by human eyes.

Generally, in response to a touch operation performed by the user on the TP or a UI event, after the vertical synchronization signal 1 arrives, the UI framework may invoke the UI thread to draw one or more layers corresponding to the touch event, and then invoke the render thread to render the one or more layers. Then, after the vertical synchronization signal 2 arrives, a hardware composer (Hardware Composer, HWC) may invoke the composition thread to perform layer composition on one or more drawn layers (namely, one or more rendered layers) to obtain an image frame. Finally, the hardware display module may refresh and display the image frame on the LCD after the vertical synchronization signal 3 arrives. The UI event may be triggered by the touch operation performed by the user on the TP. Alternatively, the UI event may be automatically triggered by the electronic device. For example, when a foreground application of the electronic device automatically switches between images, the UI event may be triggered. The foreground application is an application corresponding to an interface currently displayed on the display of the electronic device.

The TP may periodically detect a touch operation of the user. After detecting the touch operation, the TP may wake up the vertical synchronization signal 1 and the vertical synchronization signal 2, to trigger the UI framework to perform layer drawing and rendering based on the vertical synchronization signal 1, and the hardware composer HWC to perform layer composition based on the vertical synchronization signal 2. A detection period in which the TP detects the touch operation is the same as the signal period T3 of the vertical synchronization signal 3 (for example, HW_VSYNC).

It should be noted that the UI framework periodically performs layer drawing and rendering based on the vertical synchronization signal 1, the hardware composer HWC periodically performs layer composition based on the vertical synchronization signal 2, and the LCD periodically performs image frame refreshing based on the vertical synchronization signal 3.

For example, in this embodiment of this application, an example in which the vertical synchronization signal 1 is a VSYNC_APP signal, the vertical synchronization signal 2 is a VSYNC_SF signal, and the vertical synchronization signal 3 is an HW_VSYNC signal is used herein to describe a process in which the electronic device performs drawing, rendering, composition, and image frame display.

Figure 4A:
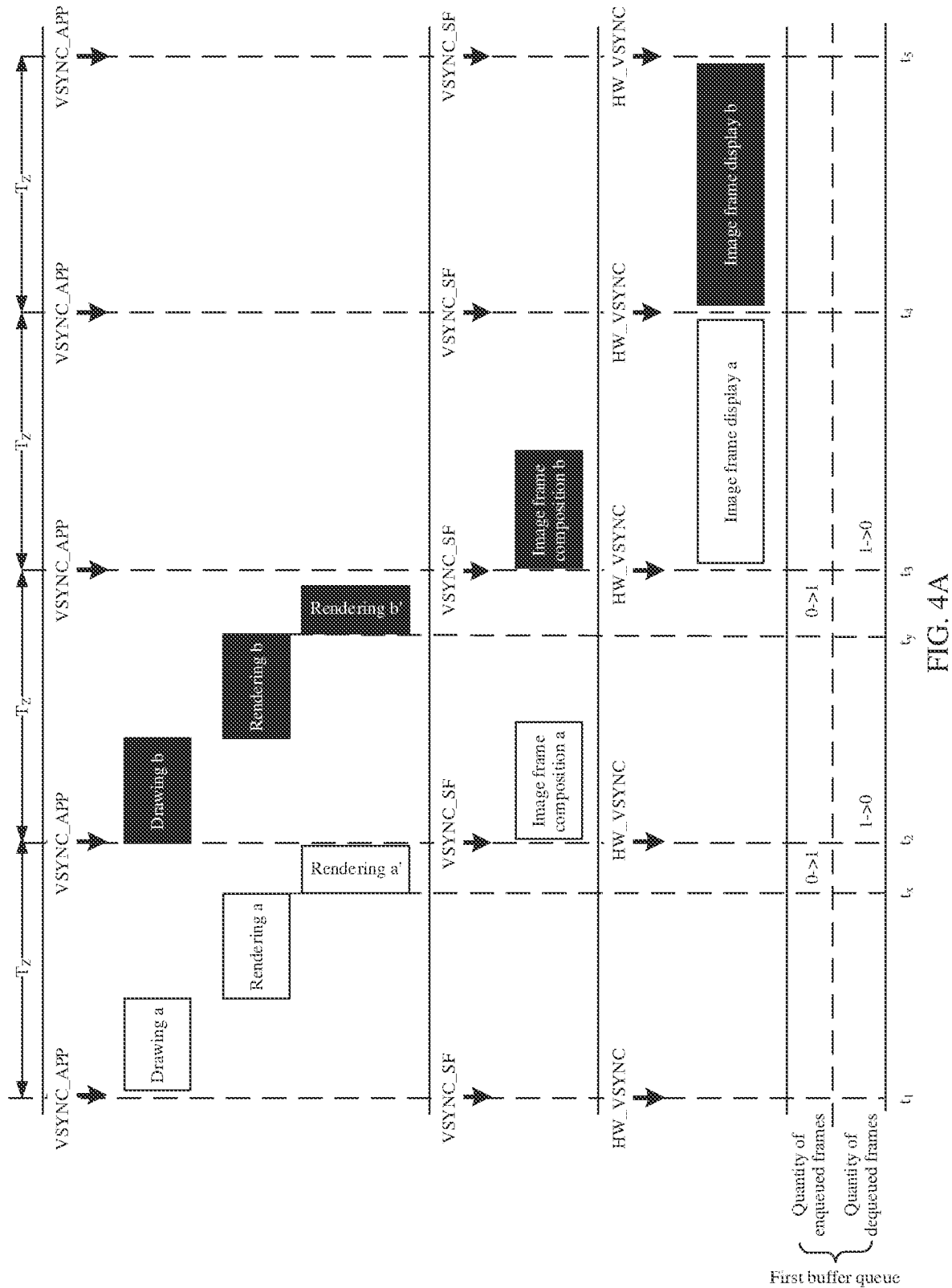
FIG. 4A is a schematic principle diagram of layer drawing, rendering, and composition, and image frame display performed by an electronic device in a solution.

For example, as shown in FIG. 4A, in response to a VSYNC_APP signal at a moment $t_1$, the UI thread of the electronic device performs "drawing a" to draw a layer a, and then the render thread performs "rendering a" and "rendering a'" to render the layer a. In response to a VSYNC_SF signal at a moment $t_2$, the composition thread of the electronic device performs "image frame composition a" to perform layer composition on the layer a, to obtain an image frame a. In response to an HW_VSYNC signal at a moment $t_3$, the LCD of the electronic device performs "image frame display a" to refresh and display the image frame a.

For another example, as shown in FIG. 4A, in response to a VSYNC_APP signal at a moment $t_2$, the UI thread of the electronic device performs "drawing b" to draw a layer b, and then the render thread performs "rendering b" and "rendering b'" to render the layer b. In response to a VSYNC_SF signal at a moment $t_3$, the composition thread of the electronic device performs "image frame composition b" to perform layer composition on the layer b, to obtain an image frame b. In response to an HW_VSYNC signal at a moment $t_4$, the LCD of the electronic device performs "image frame display b" to refresh and display the image frame b.

It should be noted that "drawing a" and "rendering a" shown in FIG. 4A are implemented in a CPU of the electronic device, and "rendering a'" is implemented in a GPU of the electronic device. "Rendering a" performed by the CPU is preparation before the GPU performs layer rendering on the drawn layer a, and "rendering a'" performed by the GPU is formal layer rendering performed by the electronic device on the drawn layer a. "Drawing b" and "rendering b" shown in FIG. 4A are implemented in the CPU of the electronic device "rendering b'" is implemented in the GPU of the electronic device. "Rendering b" performed by the CPU preparation before the GPU performs layer rendering on the drawn layer b, and "rendering b'" performed by the GPU is formal layer rendering performed by the electronic device on the drawn layer b. In other words, the drawing in this embodiment of this application may include layer drawing performed by the UI thread and preparation made by the render thread before the render thread performs layer rendering on the layer drawn by the UI thread.

Figure 4B:
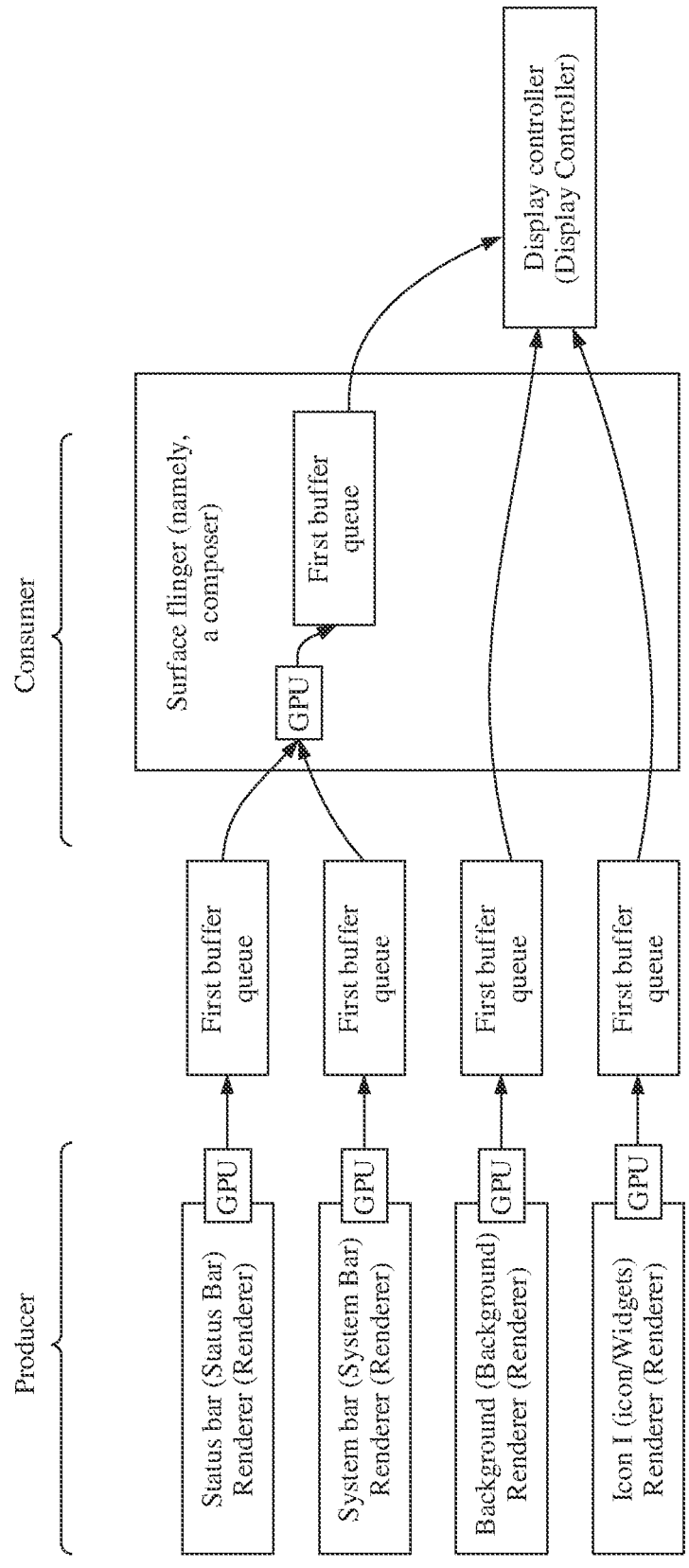
FIG. 4B is a schematic principle diagram of layer production and consumption of an electronic device in a solution.

The process of drawing, rendering, and composing a layer by the electronic device may form a graphics production-consumption model, for example, a graphics production-consumption model 400 shown in FIG. 4B. In the graphics production-consumption model 400, the UI thread and the render thread (namely, a renderer (Renderer)) of the electronic device serve as a producer to draw and render a layer. The render thread (namely, the renderer (Renderer)) may store, in a first buffer queue, a layer for which rendering preparation is completed, and perform layer rendering on the layer in the first buffer queue. As a consumer, the composition thread (namely, a composer (Surface Flinger)) reads a layer from the first buffer queue, performs layer composition on the read layer to obtain an image frame, and sends the image frame to the LCD (namely, a display controller (Display Controller)) of the electronic device for display. The first buffer queue is allocated based on an application, and one buffer queue may be allocated to one application. The first buffer queue is applied for by the render thread, and is allocated to the application.

In the graphic generation consumption model, both the producer (for example, the UI thread and the render thread) and the consumer (for example, the composition thread) generate and consume a layer based on a VSYNC signal.

When no frame freezing (that is, no frame loss) occurs, production and consumption rates in the model are consistent. The producer (for example, the render thread) generates a frame of layer (namely, frame data) at an interval of one VSYNC period (for example, the synchronization period $T_Z$), and places the frame of layer (namely, the frame data) in the first buffer queue. The consumer (for example, the composition thread) extracts a frame of layer (namely, frame data) from the first buffer queue at an interval of one VSYNC period (for example, the synchronization period $T_Z$), and performs layer composition (which is also referred to as image frame composition). In other words, a production period of the UI thread and the render thread as a producer is the same as a consumption period of the composition thread (namely, the Surface Flinger) as a consumer, and both are equal to the synchronization period $T_Z$.

Figure 5A:
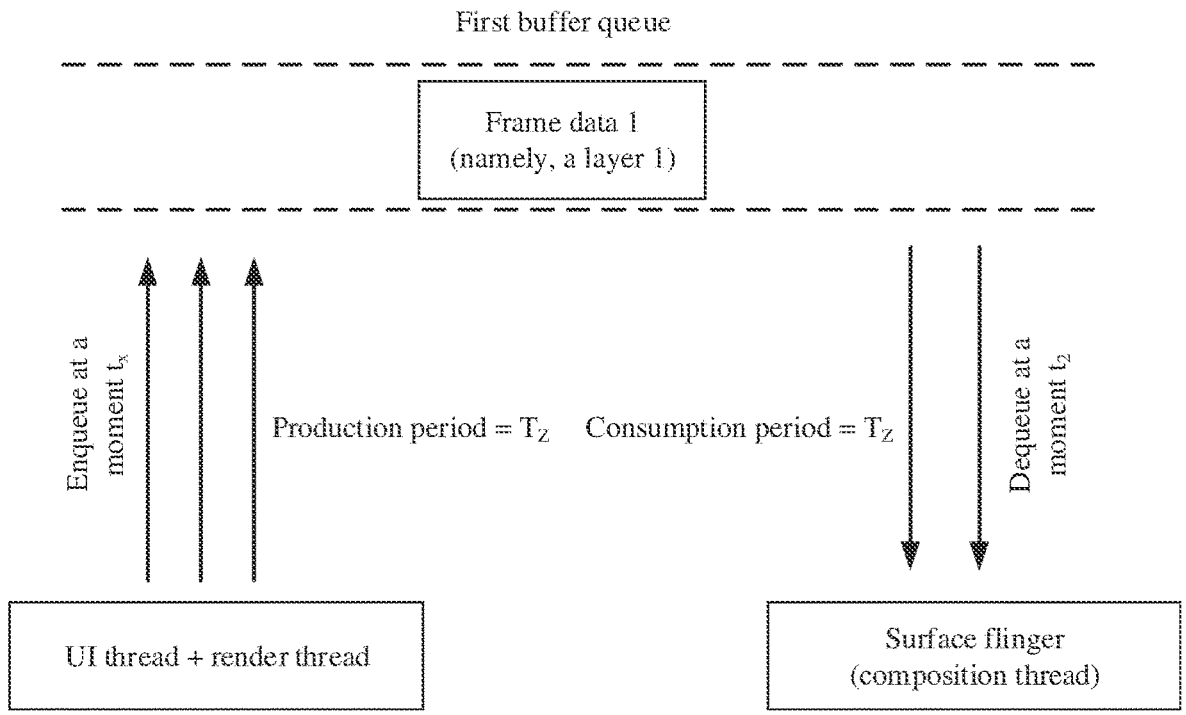
FIG. 5A is a schematic diagram of a change of frame data (namely, a layer) in a first buffer queue in a process in which the electronic device shown in FIG. 4A performs layer drawing, rendering, and composition, and image frame display.

For example, at a moment $t_x$ shown in FIG. 4A, the render thread of the electronic device completes "rendering a". In this case, the render thread may buffer, to the first buffer queue, frame data a (namely, the layer a) obtained through rendering. In other words, the producer produces a frame of layer (namely, frame data), and buffers the layer to the first buffer queue. As shown in FIG. 4A, at the moment $t_x$, a quantity of frame data (namely, layers) in the first buffer queue increases from 0 to 1 (that is, 0→1). As shown in FIG. 5A, at the moment $t_x$, the frame data a (namely, the layer a) is enqueued in the first buffer queue.

Subsequently, in response to the VSYNC_SF signal at the moment $t_2$ shown in FIG. 4A, the composition thread of the electronic device may perform "image frame composition a" (which is also referred to as layer composition a). In this case, the composition thread may read the frame data a (namely, the layer a) from the first buffer queue. In other words, the consumer consumes a frame of layer from the first buffer queue. As shown in FIG. 4A, at the moment $t_2$, the quantity of frame data (namely, layers) in the first buffer queue decreases from 1 to 0 (that is, 1→0). As shown in FIG. 5A, at the moment $t_2$, the frame data a (namely, the layer a) is dequeued from the first buffer queue.

Figure 5B:
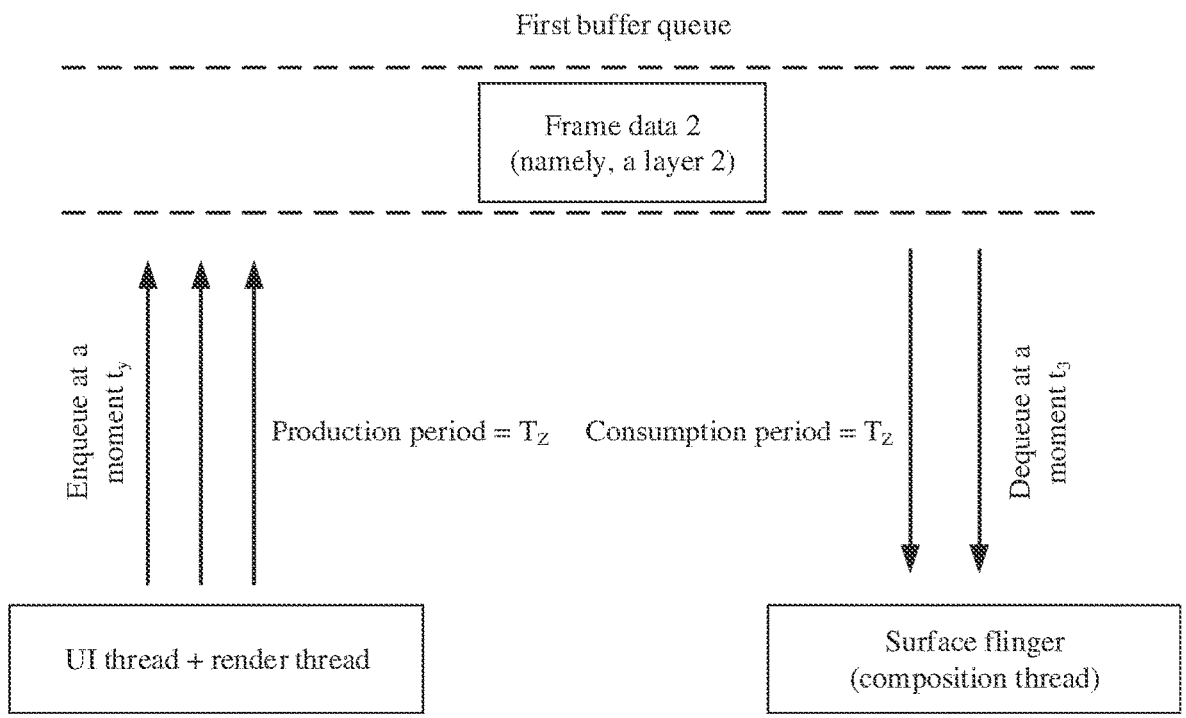
FIG. 5B is a schematic diagram of a change of frame data (namely, a layer) in a first buffer queue in a process in which the electronic device shown in FIG. 4A performs layer drawing, rendering, and composition, and image frame display.

For another example, at a moment $t_y$ shown in FIG. 4A, the render thread of the electronic device completes "rendering b". In this case, the render thread may buffer, to the first buffer queue, frame data b (namely, the layer b) obtained through rendering. In other words, the producer produces a frame of layer (namely, frame data), and buffers the layer to the first buffer queue. As shown in FIG. 4A, at the moment $t_y$, the quantity of frame data (namely, layers) in the first buffer queue increases from 0 to 1 (that is, 0→1). As shown in FIG. 5B, at the moment $t_y$, the frame data b (namely, the layer b) is enqueued in the first buffer queue.

Subsequently, in response to the VSYNC_SF signal at the moment $t_3$ shown in FIG. 4A, the composition thread of the electronic device may perform "image frame composition b" (which is also referred to as layer composition b). In this case, the composition thread may read the frame data b (namely, the layer b) from the first buffer queue. In other words, the consumer consumes a frame of layer from the first buffer queue. As shown in FIG. 4A, at the moment $t_3$, the quantity of frame data (namely, layers) in the first buffer queue decreases from 1 to 0 (that is, 1→0). As shown in FIG. 5B, at the moment $t_3$, the frame data b (namely, the layer b) is dequeued from the first buffer queue.

However, a frame loss phenomenon may occur in the process in which the electronic device performs layer drawing, rendering, and composition, and image frame refreshing and display in response to the VSYNC_APP signal, the VSYNC_SF signal, and the HW_VSYNC signal. In this way, continuity and smoothness of displaying an image on the display are affected, and visual experience of the user is affected.

A reason why the frame loss phenomenon occurs when the electronic device displays an image may be that drawing and rendering by the UI thread and the render thread take an excessively long time, and drawing and rendering cannot be completed within one VSYNC period (for example, the synchronization period $T_Z$). In this case, the producer (for example, the render thread) cannot buffer frame data (namely, a rendered layer) to the first buffer queue on time. In other words, the producer (for example, the render thread) does not buffer frame data in the first buffer queue for at least one VSYNC period. However, the consumer (for example, the composition thread) still obtains a frame of layer (namely, frame data) from the first buffer queue at the interval of one VSYNC period, and performs layer composition (which is also referred to as image frame composition).

In this case, the production rate of the producer is less than the consumption rate of the consumer. If no sufficient quantity of frame data is buffered in the first buffer queue, the consumer (for example, the composition thread) cannot read frame data from the first buffer queue after a VSYNC_SF signal arrives. In this case, in this VSYNC period, an image frame cannot be obtained through layer composition, and the image frame cannot be refreshed and displayed. A display image of the LCD cannot be updated, and the frame loss phenomenon occurs. In this way, continuity and smoothness of displaying an image on the display are affected, and visual experience of the user is affected.

Figure 6:
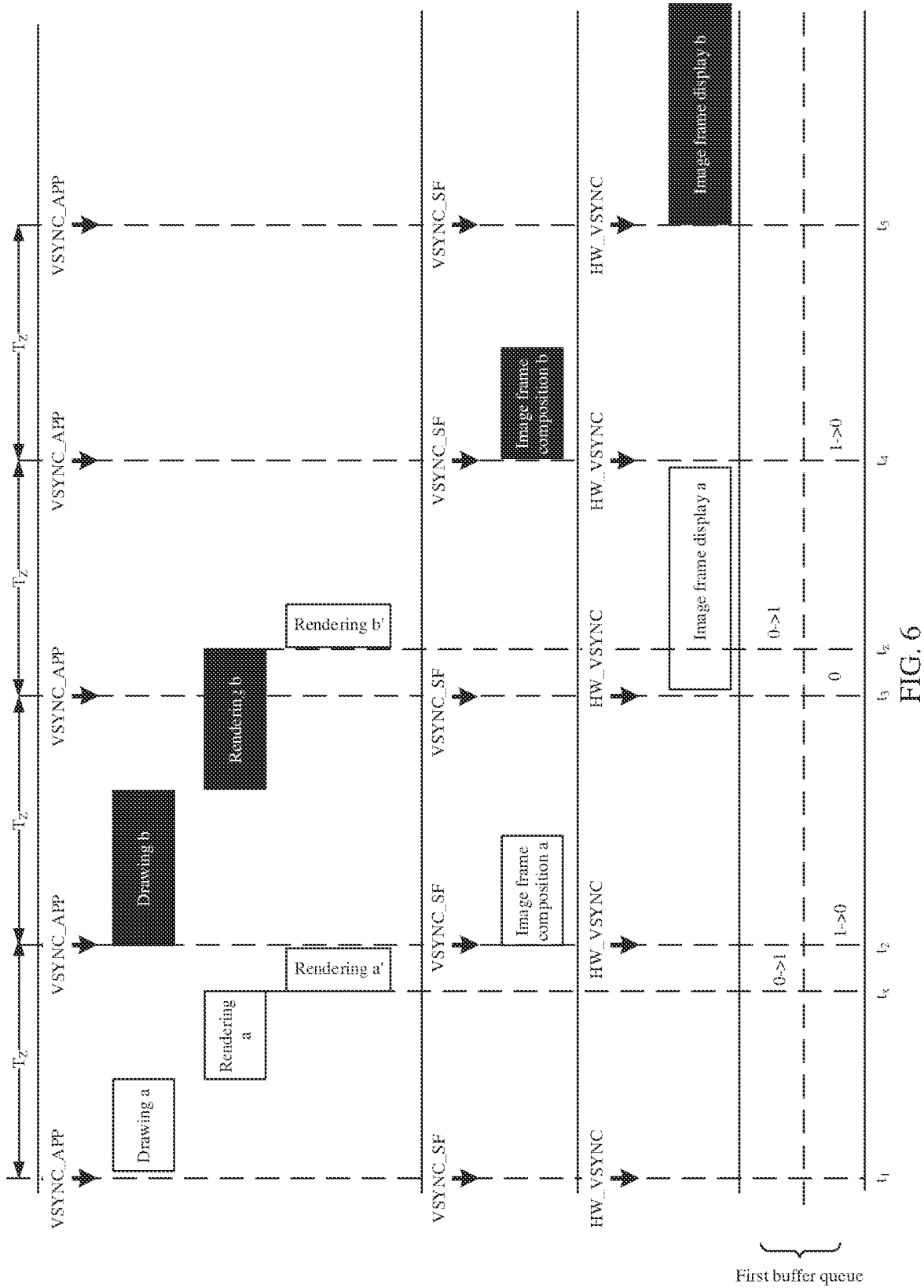
FIG. 6 is a schematic principle diagram of layer drawing, rendering, and composition, and image frame display performed by an electronic device in a solution.

For example, as shown in FIG. 6, if the render thread cannot complete "rendering b" at the moment $t_3$, the frame data b (namely, the layer b) cannot be buffered to the first buffer queue at the moment $t_3$. At the moment $t_3$, the quantity of frame data in the first buffer queue is 0. In this case, in response to the VSYNC_SF signal at the moment $t_3$, the composition thread cannot read the frame data from the first buffer queue, and therefore cannot perform layer composition to obtain the image frame. Further, the LCD of the electronic device cannot refresh and display the image frame at the moment $t_4$, and the frame loss phenomenon occurs.

The render thread completes "rendering b" at a moment $t_Z$ after the moment $t_3$, and the quantity of frame data (namely, layers) in the first buffer queue increases from 0 to 1 (that is, 0→1). The composition thread can read the frame data b (namely, the layer b) from the first buffer queue only in response to the VSYNC_SF signal at the moment $t_4$ after the moment $t_Z$, and the quantity of frame data in the first buffer queue decreases from 1 to 0 (that is, 1→2). The LCD of the electronic device can perform "image frame display b" only at a moment $t_5$ to refresh and display the image frame. "Rendering a" and "rendering b" shown in FIG. 6 are implemented in the CPU of the electronic device, and "rendering a'" and "rendering b'" are implemented in the GPU of the electronic device. For detailed descriptions of "rendering a", "rendering a'", "rendering b", and "rendering b'", refer to the detailed descriptions of FIG. 4A in the foregoing embodiment. Details are not described herein again.

It can be learned from FIG. 6 that, in a synchronization period from the moment $t_4$ to the moment $t_5$, the frame loss phenomenon occurs when an image is displayed on the display. However, according to the method in embodiments of this application, the frame loss phenomenon in the displayed image can be avoided, to prevent the display from displaying a blank image. In other words, according to the method in embodiments of this application, a probability that a frame loss occurs when the electronic device displays an image can be reduced, and smoothness of displaying an image on the display can be ensured, thereby improving visual experience of the user.

It should be noted that the frame loss phenomenon occurs when an image is displayed on the display of the electronic device not only because time taken by the UI thread to draw a layer is long or time taken by the render thread to render a layer is long, but also because a frame rate and a screen refresh rate of the electronic device are high.

For example, when the frame rate of the electronic device is 60 Hz, signal periods $T_Z$ of the VSYNC_APP signal, the VSYNC_SF signal, and the HW_VSYNC signal are 16.66 ms. If the UI thread and the render thread can complete drawing and rendering of each frame of layer within 16.66 ms, no frame loss phenomenon occurs when an image is displayed on the display of the electronic device.

For another example, after the frame rate of the electronic device increases to 120 Hz, the signal periods $T_Z$ of the VSYNC_APP signal, the VSYNC_SF signal, and the HW_VSYNC signal are 8.33 ms. If the UI thread and the render thread can complete drawing and rendering of each frame of layer within 8.33 ms, no frame loss phenomenon occurs when an image is displayed on the display of the electronic device.

It may be understood that, compared with completing drawing and rendering of a frame of layer within 16.66 ms, it is more difficult for the electronic device to complete drawing and rendering of a frame of layer within 8.33 ms. Therefore, in a scenario of a high frame rate, there is a high probability that the frame loss phenomenon occurs when an image is displayed on the display of the electronic device.

It should be noted that a reason why the frame loss phenomenon occurs when the electronic device displays an image may be that the electronic device cannot complete drawing and rendering of a frame of layer within one frame (namely, one synchronization period $T_Z$), or the electronic device cannot complete layer composition of a frame of layer within one frame (namely, one synchronization period $T_Z$). It is assumed that time taken by the UI thread and the render thread of the electronic device to process a frame of layer is $t_{cpu}$, and time taken by the composition thread to process a frame of layer is $t_{SF}$. A condition for the electronic device to display an image without a frame loss is Max$\{t_{cpu}, t_{SF}\}<T_Z$. Max$\{\ \}$ indicates that a maximum value in $\{\ \}$ is used. In the following embodiments, the method in embodiments of this application is described by using an example in which the UI thread and the render thread cannot complete drawing and rendering of a frame of layer within one frame, resulting in a frame loss of an image displayed on the electronic device.

In some current solutions, to reduce a probability that a frame loss occurs when the electronic device displays an image, and ensure smoothness of displaying an image on the display, working frequencies of the CPU and the GPU of the electronic device are increased. Increasing the working frequencies of the CPU and the GPU of the electronic device can improve processing speeds of the UI thread and the render thread, thereby reducing time taken by the UI thread and the render thread to draw a layer and render the layer, and further reducing the probability that the frame loss occurs when the electronic device displays an image. However, increasing the working frequencies of the CPU and the GPU of the electronic device increases power consumption of the electronic device, and reduces battery life of the electronic device. It can be learned that a solution in which a frame loss rate is reduced by increasing a working frequency has low energy efficiency.

Figure 7:
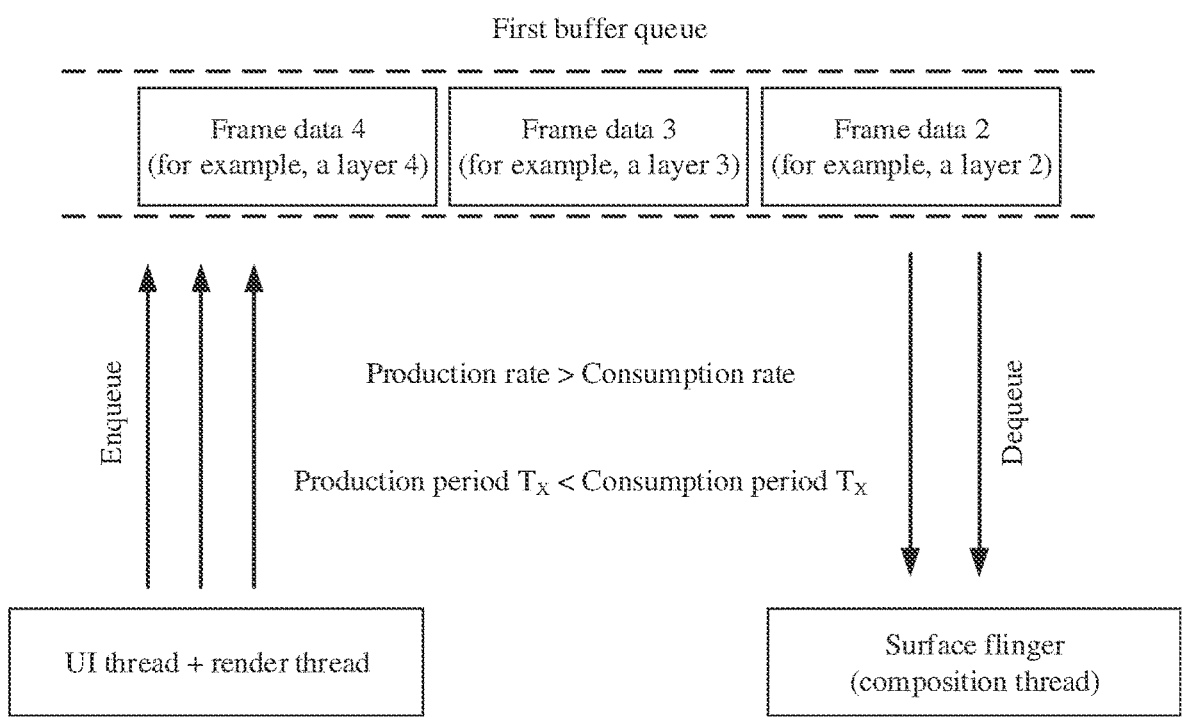
FIG. 7 is a schematic principle diagram of a vertical synchronization signal-based control method according to an embodiment of this application.

An embodiment of this application provides a vertical synchronization signal-based control method, to adjust a signal period of the VSYNC_APP signal, so that the signal period of the VSYNC_APP signal is less than a signal period of the VSYNC_SF signal. In this way, a quantity of frame data generated by the UI thread and the render thread within same duration may be greater than a quantity of frame data consumed by the composition thread within the same duration. In other words, a production rate shown in FIG. 7 is greater than a consumption rate. In this way, as shown in FIG. 7, sufficient frame data may be buffered in the first buffer queue, and may be consumed by the composition thread. In this way, a problem that the composition thread cannot read frame data from the first buffer queue in response to the VSYNC_APP signal does not occur, and the probability that the frame loss occurs when the electronic device displays an image can be reduced. By using the foregoing solution, the probability that the frame loss occurs when the electronic device displays an image can be reduced without increasing power consumption of the electronic device, and smoothness of displaying an image on the display can be ensured.

For example, the method provided in this embodiment of this application may be performed by an image processing apparatus. The apparatus may be any one of the foregoing electronic devices (for example, the apparatus may be the electronic device 100 shown in FIG. 1). Alternatively, the apparatus may be a central processing unit (Central Processing Unit, CPU) of the electronic device, or a control module that is in the electronic device and that is configured to perform the method provided in this embodiment of this application. In embodiments of this application, an example in which the electronic device (for example, a mobile phone) performs the image processing method is used to describe the method provided in embodiments of this application.

Embodiment (1)

An embodiment of this application provides a vertical synchronization signal-based control method. The method may be applied to an electronic device including a display. In this embodiment, a vertical synchronization signal 1 (for example, a VSYNC_APP signal) is a first vertical synchronization signal, and a vertical synchronization signal 2 (for example, a VSYNC_SF signal) is a second vertical synchronization signal.

Figure 8:
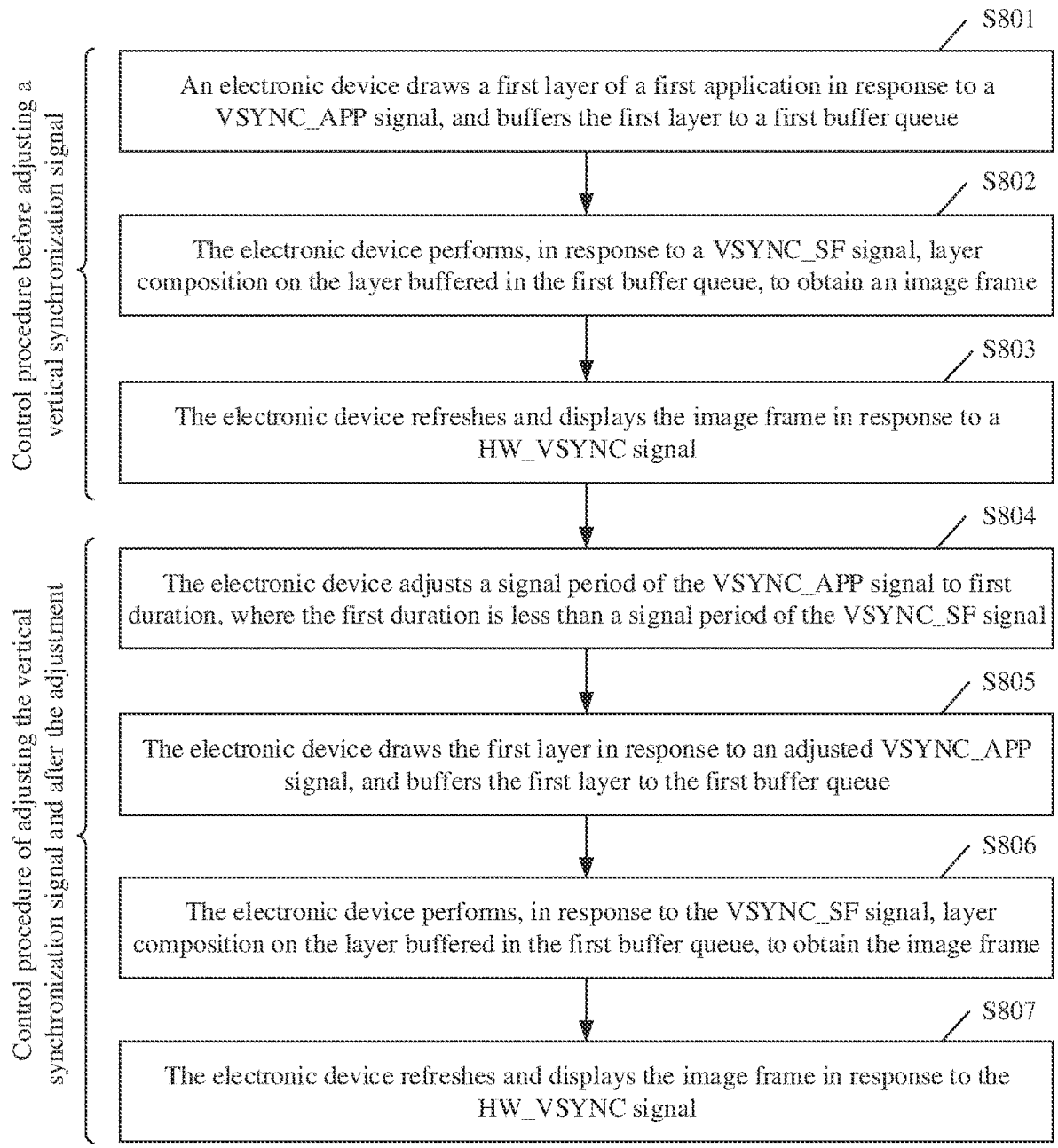
FIG. 8 is a flowchart of a vertical synchronization signal-based control method according to an embodiment of this application.

As shown in FIG. 8, the vertical synchronization signal-based control method may include S801 to S807. The vertical synchronization signal-based method may include a "control procedure before adjusting a vertical synchronization signal" and a "control procedure of adjusting the vertical synchronization signal and after the adjustment". As shown in FIG. 8, the "control procedure before adjusting a vertical synchronization signal" may include S801 to S803.

S801: The electronic device draws a first layer of a first application in response to the VSYNC_APP signal, and buffers the first layer to a first buffer queue.

The drawing in this embodiment of this application may include layer drawing performed by a UI thread and preparation made by a render thread before the render thread performs layer rendering on the layer drawn by the UI thread. For example, the drawing in S801 may include "drawing a" and "rendering a" or "drawing b" and "rendering b" shown in FIG. 6. For another example, the drawing in S801 may include "drawing 1" and "rendering 1" or "drawing 2" and "rendering 2" shown in FIG. 10.

Specifically, S801 may include: The UI thread draws the first layer in response to the VSYNC_APP signal; and the render thread prepares for rendering the first layer drawn by the UI thread, and buffers the first layer to the first buffer queue. It should be noted that, after the render thread buffers the first layer to the first buffer queue, the render thread may formally render the first layer buffered in the first buffer queue. Then, a composition thread may perform layer composition on the layer buffered in the first buffer queue to obtain an image frame. The first application is a foreground application. For detailed description of the foreground application, refer to related content in Embodiment (6).

S802: The electronic device performs, in response to the VSYNC_SF signal, layer composition on the layer buffered in the first buffer queue, to obtain the image frame.

S803: The electronic device refreshes and displays the image frame in response to an HW_VSYNC signal.

Generally, a production period $T_S$ in which the UI thread and the render thread of the electronic device produce frame data (namely, a layer) to the first buffer queue is equal to a consumption period $T_X$ in which the composition thread consumes frame data (namely, a layer) in the first buffer queue, that is, $T_S=T_X=T_Z$. A signal period of the VSYNC_APP signal is the production period $T_S$ in which the UI thread and the render thread produce the frame data to the first buffer queue. A signal period of the VSYNC_SF signal is the consumption period $T_X$ in which the composition thread consumes the frame data in the first buffer queue.

As described in S801 to S803, the electronic device controls the VSYNC_APP signal and the VSYNC_SF signal based on the same production period $T_S$ and consumption period $T_X$. When the production period $T_S$=the consumption period $T_X$, if the UI thread and the render thread can complete drawing and rendering preparation of a frame of layer within one frame (namely, one synchronization period $T_Z$), a production rate of the UI thread and the render thread (namely, a producer) is equal to a consumption rate of the composition thread (namely, a consumer). No frame loss occurs when the electronic device displays an image.

However, if the UI thread and the render thread cannot complete drawing and rendering preparation of a frame of layer within one frame (namely, one synchronization period $T_Z$), the consumption rate of the composition thread (namely, the consumer) is greater than the production rate of the UI thread and the render thread (namely, the producer). In this way, a quantity of frame data (namely, layers) buffered in the first buffer queue is 0, and the consumer (for example, the composition thread) cannot read frame data from the first buffer queue after a VSYNC_SF signal arrives. In this case, in this VSYNC period, an image frame cannot be obtained through layer composition, and the image frame cannot be refreshed and displayed. A display image of an LCD cannot be updated, and the frame loss phenomenon shown in FIG. 6 occurs. In this way, continuity and smoothness of displaying an image on the display are affected, and visual experience of the user is affected.

It can be learned from the foregoing descriptions that a reason why the frame loss phenomenon occurs when the electronic device displays an image is that the consumer (for example, the composition thread) cannot read frame data from the first buffer queue after a VSYNC_SF signal arrives. Conversely, if the consumer (for example, the composition thread) can read frame data from the first buffer queue after a VSYNC_SF signal arrives, the frame loss phenomenon does not occur when the electronic device displays an image.

A prerequisite for the consumer (for example, the composition thread) to read frame data (namely, a layer) from the first buffer queue after a VSYNC_SF signal arrives is as follows: When the VSYNC_SF signal arrives, the frame data (namely, the layer) is buffered in the first buffer queue. To ensure that the frame data is buffered in the first buffer queue when the VSYNC_SF signal arrives, as shown in FIG. 7, the production rate of the producer (namely, the UI thread and the render thread) is required to be greater than the consumption rate of the consumer (namely, the composition thread).

To ensure that the production rate of the producer (namely, the UI thread and the render thread) is greater than the consumption rate of the consumer (namely, the composition thread), within same duration, a quantity of frame data produced by the producer is required to be greater than a quantity of frame data consumed by the consumer. In this case, as shown in FIG. 7, the production period $T_S$ of the producer is required to be smaller than the consumption period $T_X$ of the consumer.

In this embodiment of this application, the production period $T_S$ of the producer may be adjusted, so that the production period $T_S$ of the producer is less than the consumption period $T_X$ of the consumer. In this way, a probability that a frame loss occurs when the electronic device displays an image can be reduced, and smoothness of displaying an image on the display can be ensured. Specifically, as shown in FIG. 8, the "control procedure of adjusting the vertical synchronization signal and after the adjustment" may include S804 to S807.

S804: The electronic device adjusts the signal period of the VSYNC_APP signal to first duration, where the first duration is less than the signal period of the VSYNC_SF signal.

It may be understood that, because the first duration is less than the signal period of the VSYNC_SF signal, after the electronic device adjusts the signal period of the VSYNC_APP signal to the first duration, the signal period of the VSYNC_APP signal is less than the signal period of the VSYNC_SF signal.

Figure 9:
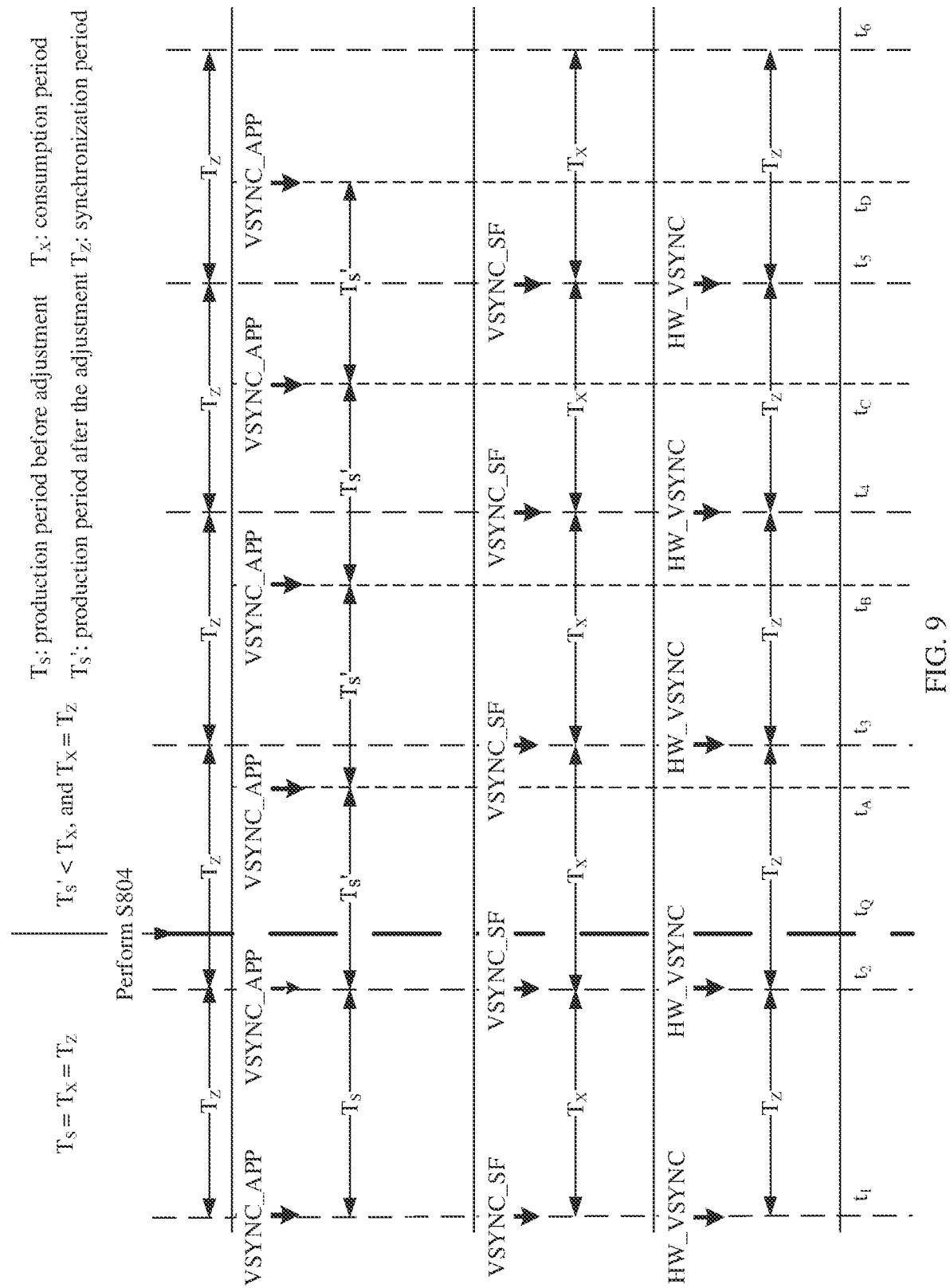
FIG. 9 is a schematic principle diagram of adjusting a VSYNC_APP signal and a VSYNC_SF signal in a vertical synchronization signal-based control method according to an embodiment of this application.
Figure 10:
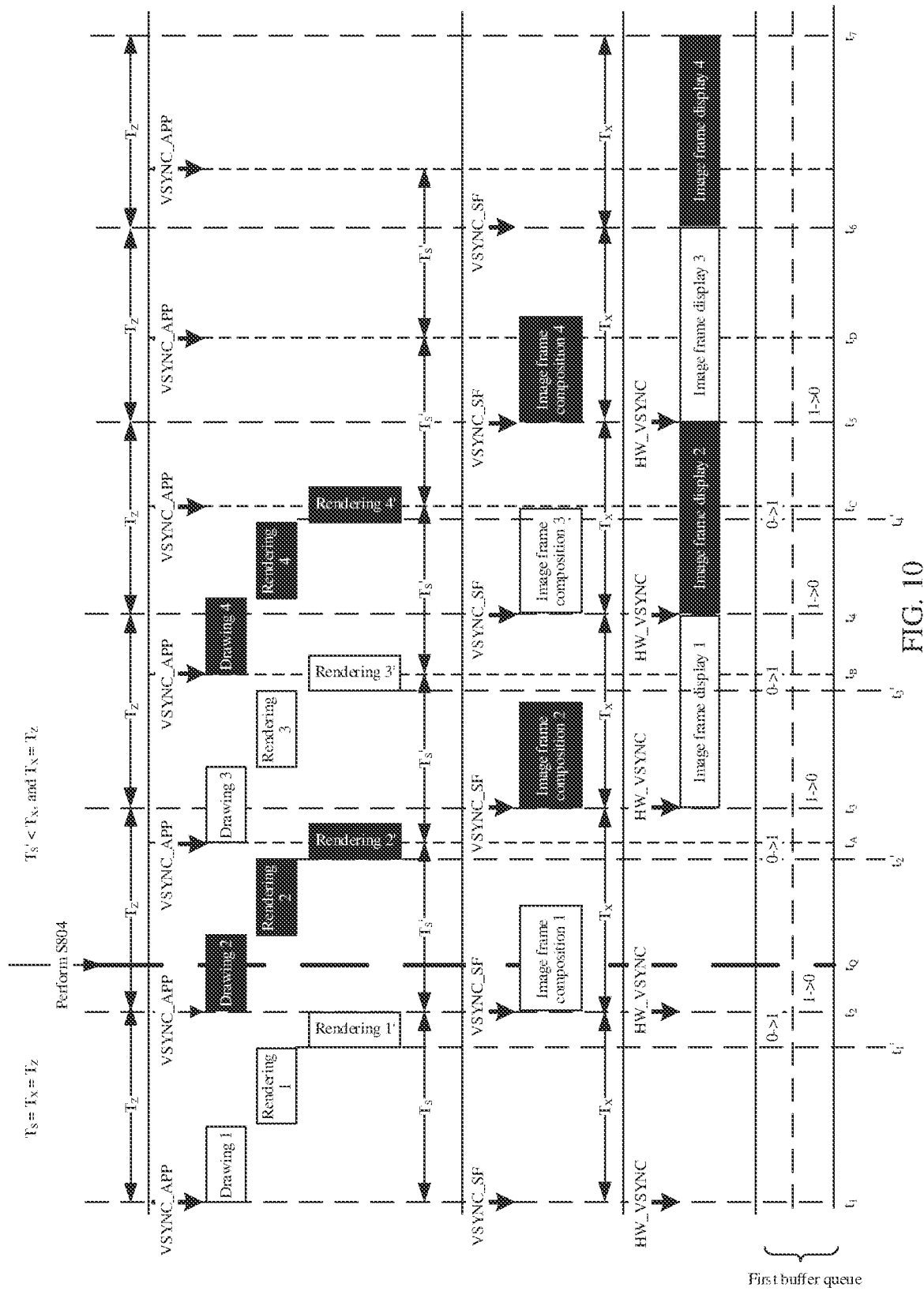
FIG. 10 is a schematic principle diagram of layer drawing, rendering, and composition, and image frame display performed by an electronic device according to an embodiment of this application.

The signal period of the VSYNC_APP signal is a production period of the electronic device, and the signal period of the VSYNC_SF signal is a consumption period of the electronic device. For example, as shown in FIG. 9 or FIG. 10, it is assumed that a production period of the electronic device before the adjustment is $T_S$, a production period of the electronic device after the adjustment is $T_S'$, and the consumption period of the electronic device is $T_X$. In other words, the first duration is equal to $T_S'$. $T_S=T_X=T_Z$, where $T_Z$ is a synchronization period of the electronic device, and $T_Z$ is equal to a reciprocal of a screen refresh rate of the electronic device. $T_S'<T_X$, and $T_S'<T_Z$.

It is assumed that the electronic device performs S804 at a moment $t_Q$ shown in FIG. 9 or FIG. 10, to adjust the production period (namely, the signal period of the VSYNC_APP signal) from $T_S$ to $T_S'$. As shown in FIG. 9 or FIG. 10, before the moment $t_Q$, the production period of the electronic device (for example, the UI thread and the render thread of the electronic device) is $T_S$. For example, an interval between a VSYNC_APP signal that arrives at a moment $t_1$ and a VSYNC_APP signal that arrives at a moment $t_2$ is $T_S$.

As shown in FIG. 9 or FIG. 10, after the moment $t_Q$, the production period of the electronic device is $T_S'$. For example, $T_S'$ after the VSYNC_APP signal at the moment $t_2$ arrives, a next VSYNC_APP signal arrives at a moment $t_A$. For another example, $T_S'$ after the VSYNC_APP signal at the moment $t_A$ arrives, a next VSYNC_APP signal arrives at a moment $t_B$. For another example, $T_S'$ after the VSYNC_APP signal at the moment $t_B$ arrives, a next VSYNC_APP signal arrives at a moment $t_C$. For another example, $T_S'$ after the VSYNC_APP signal at the moment $t_C$ arrives, a next VSYNC_APP signal arrives at a moment $t_D$.

It should be noted that, before and after the electronic device performs S804 to adjust the signal period of the VSYNC_APP signal, the signal period of the VSYNC_SF signal (namely, the consumption period of the electronic device) remains unchanged.

For example, as shown in FIG. 9, before the moment $t_Q$, the consumption period of the electronic device (for example, the composition thread of the electronic device) is $T_X$, and $T_X=T_Z$. $T_X$ after a VSYNC_SF signal at the moment $t_1$ arrives, a next VSYNC_SF signal arrives at the moment $t_2$. As shown in FIG. 9 or FIG. 10, after the moment $t_Q$, the consumption period of the electronic device (for example, the composition thread of the electronic device) is still $T_X$, and $T_X=T_Z$. For example, $T_X$ after VSYNC_SF at the moment $t_2$ arrives, a next VSYNC_SF signal arrives at a moment $t_3$. For another example, $T_X$ after VSYNC_SF at the moment $t_3$ arrives, a next VSYNC_SF signal arrives at a moment $t_4$. For another example, $T_X$ after VSYNC_SF at the moment $t_4$ arrives, a next VSYNC_SF signal arrives at a moment $t_5$.

For example, the electronic device may decrease the signal period of the VSYNC_APP signal by $\Delta T1$, so that the signal period of the VSYNC_APP signal is equal to the first duration $T_S'$, and the signal period of the VSYNC_APP signal is less than the signal period of the VSYNC_SF signal. In other words, $T_S-\Delta T1=T_S'$, and $0<\Delta T1<T_Z$. For detailed description of $\Delta T1$, refer to related content in Embodiment (3). Details are not described herein again.

S805: The electronic device draws the first layer in response to the adjusted VSYNC_APP signal, and buffers the first layer to the first buffer queue.

S806: The electronic device performs, in response to the VSYNC_SF signal, layer composition on the layer buffered in the first buffer queue, to obtain the image frame.

S807: The electronic device refreshes and displays the image frame in response to the HW_VSYNC signal.

For example, in this embodiment of this application, the "control procedure before adjusting a vertical synchronization signal" is described herein with reference to FIG. 10. In other words, the electronic device performs the control procedure before S804, for example, S801 to S803.

For example, before the electronic device performs S804, the electronic device performs S801. In response to the VSYNC_APP signal at the moment $t_1$, the UI thread performs "drawing 1" shown in FIG. 10 to draw a layer 1, and the render thread performs "rendering 1" to prepare for rendering the layer 1, and buffers frame data 1 (namely, the layer 1) to the first buffer queue. As shown in FIG. 10, the render thread may further perform "rendering 1'" to render the frame data 1 (namely, the layer 1) in the first buffer queue. As shown in FIG. 10, the render thread completes "rendering 1" at a moment $t_1'$ after the moment $t_1$, and buffers the frame data 1 (namely, the layer 1) to the first buffer queue at the moment $t_1'$. As shown in FIG. 10, at the moment $t_1'$, a quantity of frame data in the first buffer queue increases from 0 to 1 (that is, 0→1).

Subsequently, the electronic device performs S802. In response to the VSYNC_SF signal at the moment $t_2$, the composition thread performs "image frame composition 1" shown in FIG. 10 to perform layer composition on the frame data 1 (namely, the layer 1) to obtain an image frame 1. At the moment $t_2$ after the moment $t_1'$, the composition thread reads the frame data 1 (namely, the layer 1) from the first buffer queue, and the frame data 1 (namely, the layer 1) is dequeued from the first buffer queue. As shown in FIG. 10, at the moment $t_2$, the quantity of frame data in the first buffer queue decreases from 1 to 0 (that is, 1→0).

Finally, the electronic device performs S803. In response to a VSYNC_HW signal at the moment $t_3$, the LCD of the electronic device performs "image frame display 1" shown in FIG. 10 to refresh and display the image frame 1.

For another example, before the electronic device performs S804, the electronic device performs S801. In response to the VSYNC_APP signal at the moment $t_2$, the UI thread performs "drawing 2" shown in FIG. 10 to draw a layer 2, and the render thread performs "rendering 2" to prepare for rendering the layer 2, and buffers frame data 2 (namely, the layer 2) to the first buffer queue. As shown in FIG. 10, the render thread may further perform "rendering 2'" to render the frame data 2 (namely, the layer 2) in the first buffer queue. As shown in FIG. 10, the render thread completes "rendering 2" at a moment $t_2'$ after the moment $t_2$, and buffers the frame data 2 (namely, the layer 2) to the first buffer queue at the moment $t_2'$. As shown in FIG. 10, at the moment $t_2'$, the quantity of frame data in the first buffer queue increases from 0 to 1 (that is, 0→1).

Subsequently, the electronic device performs S802. In response to the VSYNC_SF signal at the moment $t_3$, the composition thread performs "image frame composition 2" shown in FIG. 10 to perform layer composition on the frame data 2 (namely, the layer 2) to obtain an image frame 2. At the moment $t_2$ after the moment $t_2'$, the composition thread reads the frame data 2 (namely, the layer 2) from the first buffer queue, and the frame data 2 (namely, the layer 2) is dequeued from the first buffer queue. As shown in FIG. 10, at the moment $t_2$, the quantity of frame data in the first buffer queue decreases from 1 to 0 (that is, 1→0).

Finally, the electronic device performs S803. In response to the VSYNC_HW signal at the moment $t_4$, the LCD of the electronic device performs "image frame display 2" shown in FIG. 10 to refresh and display the image frame 2.

For example, in this embodiment of this application, the "control procedure after adjusting the vertical synchronization signal" is described herein with reference to FIG. 10. In other words, the electronic device performs the control procedure after S804, for example, S805 to S807.

For example, the electronic device performs S804 at the moment $t_Q$ after the moment $t_2$. After the electronic device performs S804, the signal period (namely, the production period) of the VSYNC_APP signal changes from $T_S$ to $T_S'$, and $T_S'<T_S$. The signal period $T_X$ (namely, the consumption period) of the VSYNC_SF signal remains unchanged, that is, $T_S=T_X=T_Z$.

After the electronic device performs S804, a next VSYNC_APP signal arrives at the moment $t_A$ after a moment (namely, the moment $t_1$) at which the VSYNC_APP signal at the moment $t_1$ arrives. An interval between the moment $t_A$ and the moment $t_1$ is $T_S'$. The electronic device may perform S805. In response to the VSYNC_APP signal at the moment $t_A$, the UI thread performs "drawing 3" shown in FIG. 10 to draw a layer 3, and the render thread performs "rendering 3" to prepare for rendering the layer 3, and buffers frame data 3 (namely, the layer 3) to the first buffer queue. As shown in FIG. 10, the render thread may further perform "rendering 3'" to render the frame data 3 (namely, the layer 3) in the first buffer queue. As shown in FIG. 10, the render thread completes "rendering 3" at a moment $t_3'$ after the moment $t_A$, and buffers the frame data 3 (namely, the layer 3) to the first buffer queue at the moment $t_3'$. As shown in FIG. 10, at the moment $t_3'$, the quantity of frame data in the first buffer queue increases from 0 to 1 (that is, 0→1).

Subsequently, the electronic device performs S806. In response to the VSYNC_SF signal at the moment $t_4$, the composition thread performs "image frame composition 3" shown in FIG. 10 to perform layer composition on the frame data 3 (namely, the layer 3) to obtain an image frame 3. At the moment $t_4$ after the moment $t_3'$, the composition thread reads the frame data 3 (namely, the layer 3) from the first buffer queue, and the frame data 3 (namely, the layer 3) is dequeued from the first buffer queue. As shown in FIG. 10, at the moment $t_4$, the quantity of frame data in the first buffer queue decreases from 1 to 0 (that is, 1→0).

Finally, the electronic device performs S807. In response to a VSYNC_HW signal at a moment $t_5$, the LCD of the electronic device performs "image frame display 3" shown in FIG. 10 to refresh and display the image frame 3.

For another example, after the electronic device performs S804, a next VSYNC_APP signal arrives at the moment $t_B$ after a moment (namely, the moment $t_A$) at which the VSYNC_APP signal at the moment $t_A$ arrives. An interval between the moment $t_B$ and the moment $t_A$ is $T_S'$. The electronic device may perform S805. In response to the VSYNC_APP signal at the moment $t_B$, the UI thread performs "drawing 4" shown in FIG. 10 to draw a layer 4, and the render thread performs "rendering 4" to prepare for rendering the layer 4, and buffers frame data 4 (namely, the layer 4) to the first buffer queue. As shown in FIG. 10, the render thread may further perform "rendering 4'" to render the frame data 4 (namely, the layer 4) in the first buffer queue. As shown in FIG. 10, the render thread completes "rendering 4" at a moment $t_4'$ after the moment $t_B$, and buffers the frame data 4 (namely, the layer 4) to the first buffer queue at the moment $t_4'$. As shown in FIG. 10, at the moment $t_4'$, the quantity of frame data in the first buffer queue increases from 0 to 1 (that is, 0→1).

Subsequently, the electronic device performs S806. In response to the VSYNC_SF signal at the moment $t_5$, the composition thread performs "image frame composition 4" shown in FIG. 10 to perform layer composition on the frame data 4 (namely, the layer 4) to obtain an image frame 4. At the moment $t_5$ after the moment $t_4'$, the composition thread reads the frame data 4 (namely, the layer 4) from the first buffer queue, and the frame data 4 (namely, the layer 4) is dequeued from the first buffer queue. As shown in FIG. 10, at the moment $t_5$, the quantity of frame data in the first buffer queue decreases from 1 to 0 (that is, 1→0).

Finally, the electronic device performs S807. In response to a VSYNC_HW signal at a moment $t_6$, the LCD of the electronic device performs "image frame display 4" shown in FIG. 10 to refresh and display the image frame 4.

Similarly, after the electronic device performs S804, a next VSYNC_APP signal arrives at the moment $t_C$ after a moment (namely, the moment $t_B$) at which the VSYNC_APP signal at the moment $t_B$ arrives. An interval between the moment $t_C$ and the moment $t_B$ is $T_S'$. A next VSYNC_APP signal arrives at a moment $t_d$ after a moment (namely, the moment $t_C$) at which the VSYNC_APP signal at the moment $t_C$ arrives. An interval between the moment $t_d$ and the moment $t_C$ is $T_S'$.

It may be understood that because the signal period (namely, the production period) $T_S'$ of the VSYNC_APP signal is less than the signal period (namely, the consumption period) $T_X$ of the VSYNC_SF signal, after the electronic device performs S805 to S807 for a period of time, a quantity of frame data (namely, layers) produced by the UI thread and the render thread (namely, the producer) is greater than a quantity of frame data (namely, layers) consumed by the composition thread (namely, the consumer). For example, after a period of time, the quantity of frame data (namely, layers) produced by the UI thread and the render thread (namely, the producer) is 1 greater than the quantity of frame data (namely, layers) consumed by the composition thread (namely, the consumer). In this way, after the composition thread reads a frame of layer from the first buffer queue in response to a VSYNC_SF signal, another frame of layer is further buffered in the first buffer queue. In this way, even if the UI thread and the render thread cannot complete drawing and rendering of a frame of layer within one frame (namely, one synchronization period $T_Z$), the composition thread may still read frame data from the first buffer queue after a VSYNC_SF signal arrives. In this way, the frame loss phenomenon can be avoided.

For example, when the screen refresh rate of the electronic device is 60 Hz, the synchronization period $T_Z$ of the electronic device is 16.67 ms. Before the electronic device performs S804, both the signal period (namely, the production period) $T_S$ of the VSYNC_APP signal and the signal period (namely, the consumption period) $T_X$ of the VSYNC_SF signal are 16.67 ms, that is, $T_Z=T_S=T_X=16.67$ ms.

It is assumed that the electronic device performs S804, and an adjustment value $\Delta T1$ of the production period is 0.5 ms. In this case, the adjusted signal period (namely, the production period) of the VSYNC_APP signal $T_S'=T_S-\Delta T1=16.67-0.5=16.17$ ms. $16.17/0.5=32.34$, which is rounded up to 33. When no frame loss occurs, after 33 pieces of $T_S'$ ($33 \times T_S'=33 \times 16.17=533.61$ ms), the UI thread and the render thread (namely, the producer) may produce 33 pieces of frame data (namely, layers), and the composition thread (namely, the consumer) may consume 32 ($533.61/16.67 \approx 32$) pieces of frame data (namely, layers). In this way, the producer (for example, the render thread) generates a frame of layer (namely, frame data) and places the frame of layer in the first buffer queue at an interval of $T_S'$, and the consumer (for example, the composition thread) extracts a frame of layer (namely, frame data) from the first buffer queue at an interval of $T_X$ to perform layer composition. Starting from a $34^{th}$ $T_S'$, at least one frame of layer (namely, frame data) may be buffered in the first buffer queue. In this way, even if the UI thread and the render thread cannot complete drawing and rendering of a frame of layer within one frame (namely, one synchronization period $T_Z$), the composition thread may still read frame data from the first buffer queue after a VSYNC_SF signal arrives. In this way, the frame loss phenomenon can be avoided.

For another example, when the screen refresh rate of the electronic device is 90 Hz, the synchronization period $T_Z$ of the electronic device is 11.11 ms. Before the electronic device performs S804, both the signal period (namely, the production period) $T_S$ of the VSYNC_APP signal and the signal period (namely, the consumption period) $T_X$ of the VSYNC_SF signal are 11.11 ms, that is, $T_Z=T_S=T_X=11.11$ ms.

It is assumed that the electronic device performs S804, and an adjustment value $\Delta T1$ of the production period is 0.2 ms. In this case, the adjusted signal period (namely, the production period) of the VSYNC_APP signal $T_S'=T_S-\Delta T1=11.11-0.2=10.91$ ms. $10.91/0.2=54.55$, which is rounded up to 55. When no frame loss occurs, after 55 pieces of $T_S'$ ($55 \times T_S'=55 \times 10.91=600.05$ ms), the UI thread and the render thread (namely, the producer) may produce 55 pieces of frame data (namely, layers), and the composition thread (namely, the consumer) may consume 54 ($600.05/11.11 \approx 54$) pieces of frame data (namely, layers). In this way, the producer (for example, the render thread) generates a frame of layer (namely, frame data) and places the frame of layer in the first buffer queue at an interval of $T_S'$, and the consumer (for example, the composition thread) extracts a frame of layer (namely, frame data) from the first buffer queue at an interval of $T_X$ to perform layer composition. Starting from a $56^{th}$ $T_S'$, at least one frame of layer (namely, frame data) may be buffered in the first buffer queue. In this way, even if the UI thread and the render thread cannot complete drawing and rendering of a frame of layer within one frame (namely, one synchronization period $T_Z$), the composition thread may still read frame data from the first buffer queue after a VSYNC_SF signal arrives. In this way, the frame loss phenomenon can be avoided.

For another example, when the screen refresh rate of the electronic device is 120 Hz, the synchronization period $T_Z$ of the electronic device is 8.33 ms. Before the electronic device performs S804, both the signal period (namely, the production period) $T_S$ of the VSYNC_APP signal and the signal period (namely, the consumption period) $T_X$ of the VSYNC_SF signal are 8.33 ms, that is, $T_Z=T_S=T_X=8.33$ ms.

It is assumed that the electronic device performs S804, and an adjustment value $\Delta T1$ of the production period is 0.1 ms. In this case, the adjusted signal period (namely, the production period) of the VSYNC_APP signal $T_S'=T_S-\Delta T1=8.33-0.1=8.23$ ms. $8.23/0.1=82.3$, which is rounded up to 83. When no frame loss occurs, after 83 pieces of $T_S'$ ($83 \times T_S'=83 \times 8.23=683.09$ ms), the UI thread and the render thread (namely, the producer) may produce 83 pieces of frame data (namely, layers), and the composition thread (namely, the consumer) may consume 82 ($683.09/8.33 \approx 82$) pieces of frame data (namely, layers). In this way, the producer (for example, the render thread) generates a frame of layer (namely, frame data) and places the frame of layer in the first buffer queue at an interval of $T_S'$, and the consumer (for example, the composition thread) extracts a frame of layer (namely, frame data) from the first buffer queue at an interval of $T_X$ to perform layer composition. Starting from an $84^{th}$ $T_S'$, at least one frame of layer (namely, frame data) may be buffered in the first buffer queue. In this way, even if the UI thread and the render thread cannot complete drawing and rendering of a frame of layer within one frame (namely, one synchronization period $T_Z$), the composition thread may still read frame data from the first buffer queue after a VSYNC_SF signal arrives. In this way, the frame loss phenomenon can be avoided.

In conclusion, by using the foregoing solution, the probability that the frame loss occurs when the electronic device displays an image can be reduced without increasing power consumption of the electronic device, and smoothness of displaying an image on the display can be ensured.

After the electronic device performs S804, the signal period of the VSYNC_APP signal becomes smaller. In this case, there may be a doubt that whether the frame loss problem is aggravated after the VSYNC_APP signal period is decreased, because before the signal period of the VSYNC_APP signal is decreased, a frame loss may occur on an image displayed by the electronic device because drawing and rendering cannot be completed within one frame (namely, the signal period of the VSYNC_APP signal).

In the entire processing process, decreasing the signal period of the VSYNC_APP signal does not aggravate the frame loss problem. A reason is as follows: Even if the signal period of the VSYNC_APP signal is decreased, most layers can be drawn and rendered within one frame, and only a few layers cannot be drawn and rendered within one frame. In addition, after the signal period of the VSYNC_APP signal is decreased, the producer (namely, the UI thread and the render thread) may produce more frame data within same duration. In this way, sufficient frame data may be buffered in the first buffer queue. Even if the UI thread and the render thread cannot complete drawing and rendering of a frame of layer within one frame (namely, one synchronization period $T_Z$), the composition thread may still read frame data from the first buffer queue after a VSYNC_SF signal arrives. In this way, the frame loss phenomenon can be avoided.

Embodiment (2)

Figure 11:
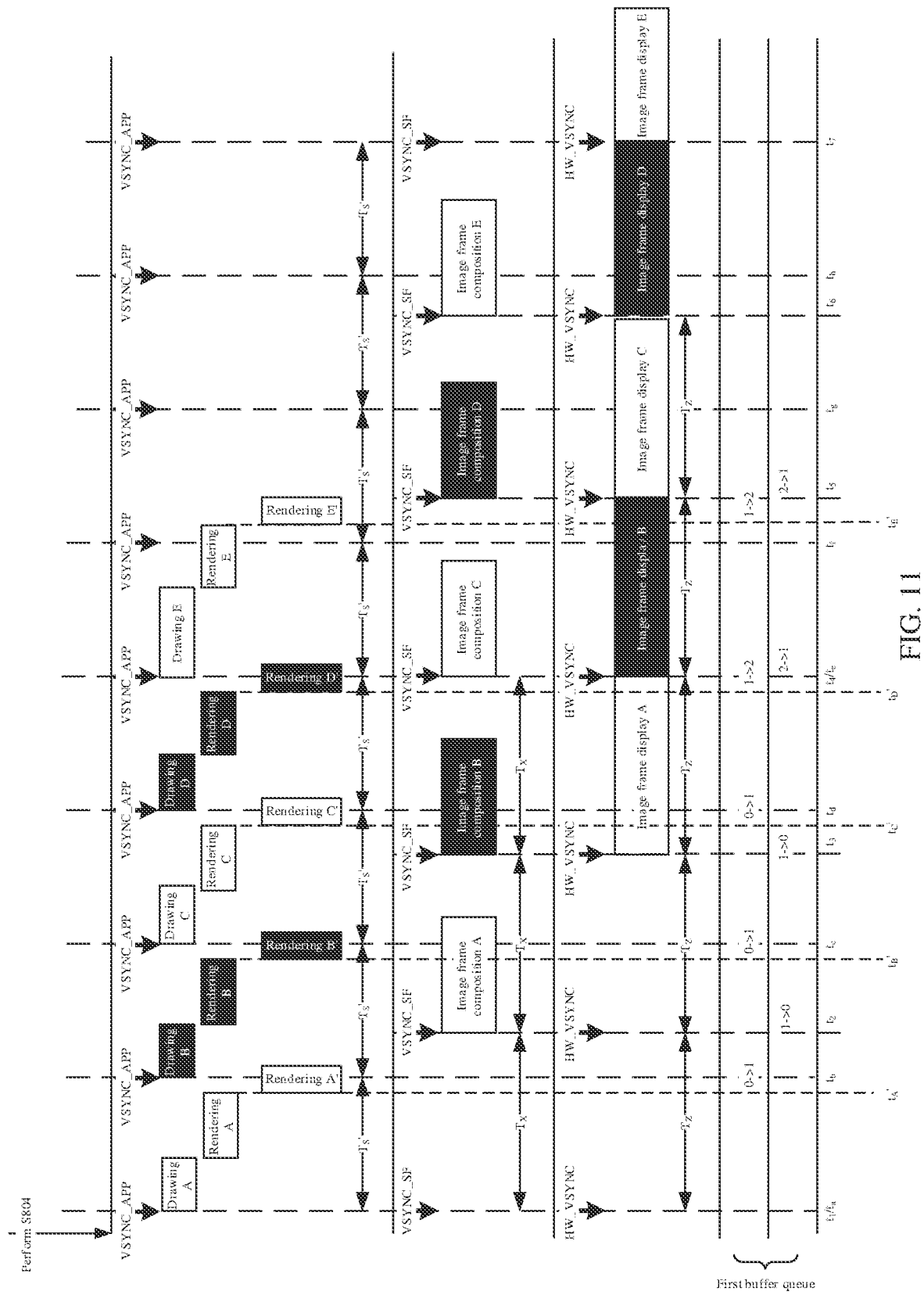
FIG. 11 is another schematic principle diagram of layer drawing, rendering, and composition, and image frame display performed by an electronic device according to an embodiment of this application.

In this embodiment, $4 \times T_S' = 3 \times T_X$ is used as an example herein to describe effects of this embodiment of this application with reference to FIG. 11. As shown in FIG. 11, a time period from a moment $t_1$ (namely, a moment $t_a$) to a moment $t_4$ (namely, a moment $t_e$) includes three $T_X$s, and a time period from the moment $t_a$ (namely, the moment t) to the moment $t_e$ (namely, the moment $t_4$) includes four $T_S$'s.

For example, as shown in FIG. 11, the electronic device performs S804 before the moment $t_1$. After the electronic device performs S804, the signal period (namely, the production period) of the VSYNC_APP signal is $T_S'$, and $T_S' < T_S$; and the signal period (namely, the consumption period) $T_X$ of the VSYNC_SF signal remains unchanged, and $T_S = T_X = T_Z$. The following describes, in a time sequence, a procedure in which the electronic device performs drawing, rendering, image frame composition, and image frame display that are shown in FIG. 11.

After the electronic device performs S804, a next VSYNC_APP signal arrives at a moment $t_b$ after a moment (namely, the moment $t_1/t_a$) at which a VSYNC_APP signal at the moment $t_1$ (namely, the moment $t_a$) arrives. An interval between the moment $t_b$ and the moment $t_a$ is $T_S'$. In response to the VSYNC_APP signal at the moment $t_a$, the UI thread of the electronic device performs "drawing A" shown in FIG. 11 to draw a layer A, and the render thread performs "rendering A" to prepare for rendering the layer A, and buffers frame data A (namely, the layer A) to the first buffer queue. As shown in FIG. 11, the render thread may further perform "rendering A'" to render the frame data A (namely, the layer A) in the first buffer queue. As shown in FIG. 11, the render thread completes "rendering A" at a moment $t_A'$ after the moment $t_a$, and buffers the frame data A (namely, the layer A) to the first buffer queue at the moment $t_A'$. As shown in FIG. 11, at the moment $t_A'$, the quantity of frame data in the first buffer queue increases from 0 to 1 (that is, 0→1).

After the moment $t_A'$, in response to a VSYNC_APP signal at a moment $t_b$, the UI thread of the electronic device performs "drawing B" shown in FIG. 11 to draw a layer B, and the render thread performs "rendering B" to prepare for rendering the layer B, and buffers frame data B (namely, the layer B) to the first buffer queue. As shown in FIG. 11, the render thread may further perform "rendering B'" to render the frame data B (namely, the layer B) in the first buffer queue.

After the moment $t_b$, in response to a VSYNC_SF signal at a moment $t_2$, the composition thread of the electronic device performs "image frame composition A" shown in FIG. 11 to perform layer composition on the frame data A (namely, the layer A) to obtain an image frame A. At the moment $t_2$, the composition thread reads the frame data A (namely, the layer A) from the first buffer queue, and the frame data A (namely, the layer A) is dequeued from the first buffer queue. As shown in FIG. 11, at the moment $t_2$, the quantity of frame data in the first buffer queue decreases from 1 to 0 (that is, 1→0).

As shown in FIG. 11, the render thread completes "rendering B" at a moment $t_B'$ after the moment $t_2$, and buffers the frame data B (namely, the layer B) to the first buffer queue at the moment $t_B'$. As shown in FIG. 11, at the moment $t_B'$, the quantity of frame data in the first buffer queue increases from 0 to 1 (that is, 0→1).

After the moment $t_B'$, in response to a VSYNC_APP signal at a moment $t_c$, the UI thread of the electronic device performs "drawing C" shown in FIG. 11 to draw a layer C, and the render thread performs "rendering C" to prepare for rendering the layer C, and buffers frame data C (namely, the layer C) to the first buffer queue. As shown in FIG. 11, the render thread may further perform "rendering C'" to render the frame data C (namely, the layer C) in the first buffer queue.

After the moment $t_c$, in response to a VSYNC_SF signal at a moment $t_3$, the composition thread of the electronic device performs "image frame composition B" shown in FIG. 11 to perform layer composition on the frame data B (namely, the layer B) to obtain an image frame B. At the moment $t_3$, the composition thread reads the frame data B (namely, the layer B) from the first buffer queue, and the frame data B (namely, the layer B) is dequeued from the first buffer queue. As shown in FIG. 11, at the moment $t_3$, the quantity of frame data in the first buffer queue decreases from 1 to 0 (that is, 1→0). In response to an HW_VSYNC signal at the moment $t_3$, the LCD of the electronic device performs "image frame display A" shown in FIG. 11 to refresh and display the image frame A.

As shown in FIG. 11, the render thread completes "rendering C" at a moment $t_C'$ after the moment $t_3$, and buffers the frame data C (namely, the layer C) to the first buffer queue at the moment $t_C'$. As shown in FIG. 11, at the moment $t_C'$, the quantity of frame data in the first buffer queue increases from 0 to 1 (that is, 0→1). After the moment $t_C'$, in response to a VSYNC_APP signal at a moment $t_d$, the UI thread of the electronic device performs "drawing D" shown in FIG. 11 to draw a layer D, and the render thread performs "rendering D" to prepare for rendering the layer D, and buffers frame data D (namely, the layer D) to the first buffer queue. As shown in FIG. 11, the render thread may further perform "rendering D'" to render the frame data D (namely, the layer D) in the first buffer queue.

As shown in FIG. 11, the render thread completes "rendering D" at a moment $t_D$ after the moment $t_d$, and buffers frame data D (namely, the layer D) to the first buffer queue at the moment $t_D'$. As shown in FIG. 11, at the moment $t_D'$, the quantity of frame data in the first buffer queue increases from 1 to 2 (that is, 1→2).

After the moment $t_D'$, in response to a VSYNC_SF signal at the moment $t_4$ (namely, the moment $t_e$), the composition thread of the electronic device performs "image frame composition C" shown in FIG. 11 to perform layer composition on the frame data C (namely, the layer C) to obtain an image frame C. At the moment $t_4$, the composition thread reads the frame data C (namely, the layer C) from the first buffer queue, and the frame data C (namely, the layer C) is dequeued from the first buffer queue. As shown in FIG. 11, at the moment $t_4$, the quantity of frame data in the first buffer queue decreases from 2 to 1 (that is, 2→1). In response to an HW_VSYNC signal at the moment $t_4$, the LCD of the electronic device performs "image frame display B" shown in FIG. 11 to refresh and display the image frame B.

In response to a VSYNC_APP signal at the moment $t_4/t_e$, the UI thread of the electronic device performs "drawing E" shown in FIG. 11 to draw a layer E, and the render thread performs "rendering E" to prepare for rendering the layer E, and buffers frame data E (namely, the layer E) to the first buffer queue. As shown in FIG. 11, the render thread may further perform "rendering E'" to render the frame data E (namely, the layer E) in the first buffer queue.

As shown in FIG. 11, the render thread completes "rendering E" at a moment $t_E'$, and buffers the frame data E (namely, the layer E) to the first buffer queue at the moment $t_E'$. As shown in FIG. 11, at the moment $t_E'$, the quantity of frame data in the first buffer queue increases from 1 to 2 (namely, 1→2).

After the moment $t_E'$, in response to a VSYNC_SF signal at a moment $t_5$, the composition thread of the electronic device performs "image frame composition D" shown in FIG. 11 to perform layer composition on the frame data D (namely, the layer D) to obtain an image frame D. At the moment $t_5$, the composition thread reads the frame data D (namely, the layer D) from the first buffer queue, and the frame data D (namely, the layer D) is dequeued from the first buffer queue. As shown in FIG. 11, at the moment $t_5$, the quantity of frame data in the first buffer queue decreases from 2 to 1 (that is, 2→1). In response to an HW_VSYNC signal at the moment $t_5$, the LCD of the electronic device performs "image frame display C" shown in FIG. 11 to refresh and display the image frame C.

As shown in FIG. 11, time taken by the UI thread to perform "drawing E" and the render thread to perform "rendering E" is at least one frame. However, at a moment $t_6$ shown in FIG. 11, a frame layer (namely, frame data) is buffered in the first buffer queue. For example, the quantity of frame data in the first buffer queue is 1. Therefore, in response to a VSYNC_SF signal at the moment $t_6$, the composition thread of the electronic device may read the frame data from the first buffer queue. As shown in FIG. 11, no frame loss occurs when the electronic device displays an image. It can be learned that, by using the method in this embodiment of this application, the probability that the frame loss occurs when the electronic device displays an image can be reduced, and smoothness of displaying an image on the display can be ensured.

Embodiment (3)

For example, the electronic device may decrease the signal period of the VSYNC_APP signal by $\Delta T1$, so that the signal period of the VSYNC_APP signal is less than the signal period of the VSYNC_SF signal. In other words, $T_S - \Delta T1 = T_S'$, and $0 < \Delta T1 < T_Z$. $T_S'$ is the first duration.

In an implementation, $\Delta T1$ may be pre-configured in the electronic device. For example, $\Delta T1$ may be any value such as 0.1 millisecond (ms), 0.2 ms, or 0.5 ms.

In another implementation, the electronic device may determine $\Delta T1$ based on a difference between the signal period $T_X$ ($T_X=T_S$) of the VSYNC_APP signal and a first drawing frame length of a first statistical period. $\Delta T1$ is less than or equal to the difference. The first drawing frame length is duration required by the electronic device to draw a layer. The first statistical period may include a plurality of synchronization periods.

For example, the electronic device may collect statistics on duration required for each of a plurality of times of layer drawing performed by the UI thread in the first statistical period. Then, the electronic device may use an average value of the duration required for the plurality of times of layer drawing as the first drawing frame length. Alternatively, the electronic device may use a longest duration of the duration required for the plurality of times of layer drawing as the first drawing frame length.

For example, it is assumed that the electronic device performs layer drawing and rendering preparation three times in the first statistical period. Duration required by the electronic device to draw a layer a and prepare for rendering the layer a is duration a. Duration required by the electronic device to draw a layer b and prepare for rendering the layer b is duration b. Duration required by the electronic device to draw a layer c and prepare for rendering the layer c is duration c. The electronic device may calculate an average value of the duration a, the duration b, and the duration c to obtain the first drawing frame length. Alternatively, the electronic device may use a longest duration of the duration a, the duration b, and the duration c as the first drawing frame length.

In another implementation, the electronic device may calculate $\Delta T1$ based on a requirement of the user. For example, the user expects that the electronic device can resolve a frame loss of one frame after a preset quantity (for example, K frames). $(K+1) \times T_S' = K \times T_S$.

It can be learned from $(K+1) \times T_S' = K \times T_S$ that $T_S' = T_S \times [K/(K+1)]$, and $\Delta T1 = T_S - T_S' = T_S - T_S \times [K/(K+1)]$. It can be learned from $\Delta T1 = T_S - T_S' = T_S - T_S \times [K/(K+1)]$ that $\Delta T1 = T_S/(K+1)$.

In another implementation, the electronic device may determine $\Delta T1$ based on the screen refresh rate of the electronic device. A higher screen refresh rate of the electronic device indicates smaller $\Delta T1$, and a lower screen refresh rate of the electronic device indicates larger $\Delta T1$.

The synchronization period $T_Z$ of the electronic device is equal to a reciprocal of the screen refresh rate of the electronic device. Before the electronic device performs S804, the signal period (namely, the production period) $T_S$ of the VSYNC_APP signal and the signal period (namely, the consumption period) $T_X$ of the VSYNC_SF signal are equal to the synchronization period $T_Z$.

A higher screen refresh rate of the electronic device indicates smaller $T_Z$, $T_S$, and $T_X$. For example, when the screen refresh rate of the electronic device is 60 Hz, $T_Z = T_S = T_X = 16.67$ ms; when the screen refresh rate of the electronic device is 90 Hz, $T_Z=T_S=T_X=11.11$ ms; and when the screen refresh rate of the electronic device is 120 Hz, $T_Z=T_S=T_X=8.33$ ms.

It may be understood that smaller $T_S$ indicates a lower probability that the UI thread and the render thread of the electronic device complete drawing and rendering within one frame (namely, one $T_S$), and a higher probability that the frame loss phenomenon occurs in the electronic device. Therefore, when $T_S$ is small, if ΔT1 is excessively large, a probability that the frame loss phenomenon occurs in the electronic device increases. It can be learned that, if $T_S$ is small, ΔT1 may be set to a small value; or if $T_S$ is large, ΔT1 may be set to a large value.

It can be learned from the foregoing descriptions that a higher screen refresh rate of the electronic device indicates smaller $T_Z$, $T_S$, and $T_X$. In other words, the screen refresh rate of the electronic device is inversely proportional to $T_S$. Therefore, a higher screen refresh rate of the electronic device indicates smaller ΔT1, and a lower screen refresh rate of the electronic device indicates larger ΔT1.

For example, when the screen refresh rate of the electronic device is 60 Hz, $T_S=16.67$ ms, and ΔT1 may be 0.5 ms. When the screen refresh rate of the electronic device is 90 Hz, $T_S=11.11$ ms, and ΔT1 may be 0.2 ms. When the screen refresh rate of the electronic device is 120 Hz, $T_S=8.33$ ms, and ΔT1 may be 0.1 ms.

It should be noted that if a value of ΔT1 is excessively large, an image display effect of the electronic device is affected, thereby affecting visual experience of the user. For example, the value of ΔT1 is excessively large. The electronic device originally produces 5 frames of layers within specific duration (for example, is), and plays 5 image frames corresponding to the 5 frames of layers. After the signal period of the VSYNC_APP signal is adjusted based on ΔT1, the electronic device may produce 10 frames of layers within is, but still play 5 image frames. Therefore, the value of ΔT1 cannot be excessively large. For example, ΔT1 is less than or equal to a preset duration threshold. The preset duration threshold may be 0.5 ms or 1 ms. The preset duration threshold may be pre-configured in the electronic device.

Embodiment (4)

Figure 12:
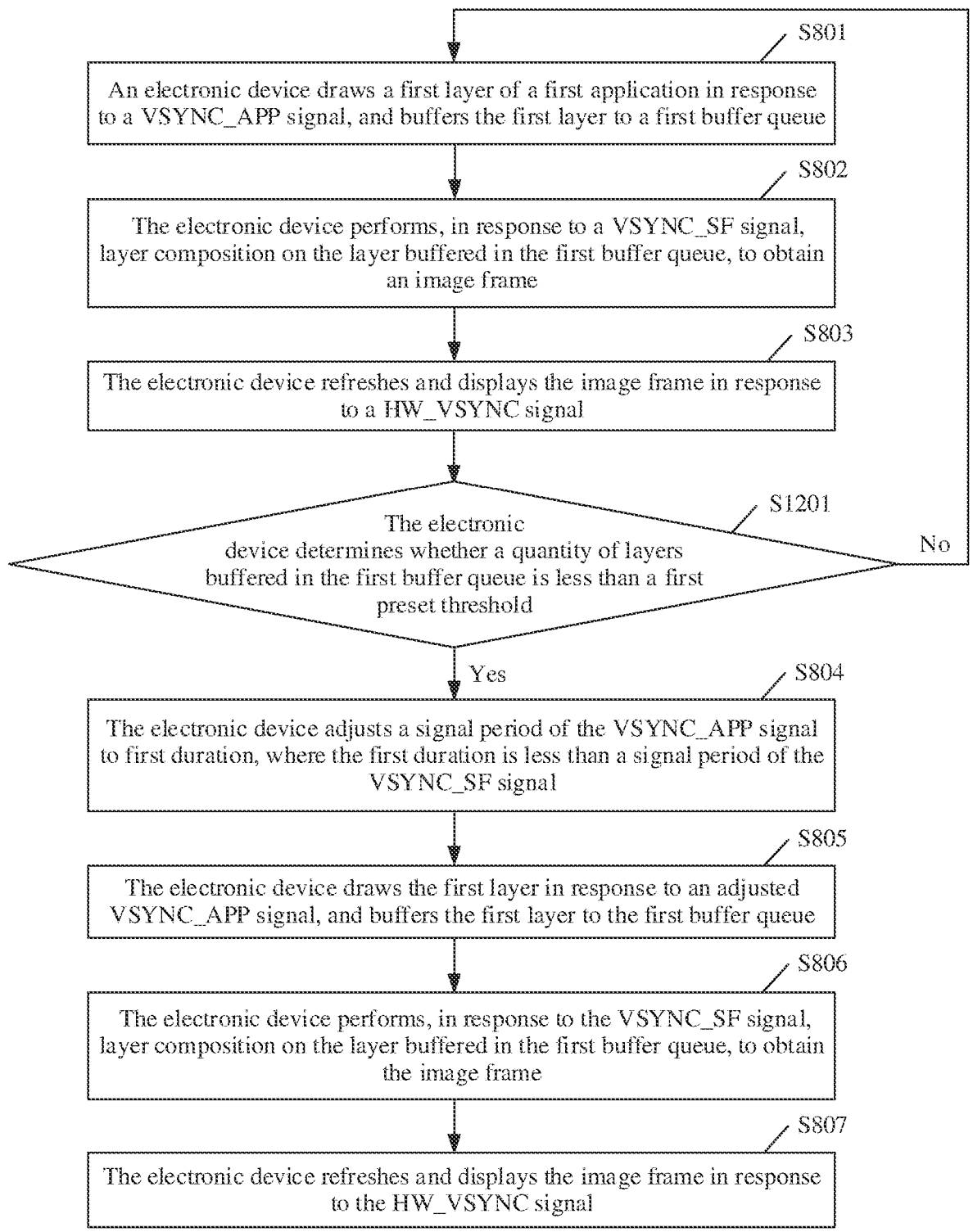
FIG. 12 is another flowchart of a vertical synchronization signal-based control method according to an embodiment of this application.

In this embodiment of this application, a condition for the electronic device to perform S804 to adjust the signal period of the VSYNC_APP signal is described herein. The electronic device may perform S804 when the quantity of layers buffered in the first buffer queue is less than a first preset threshold. Specifically, as shown in FIG. 12, before S804, the method in this embodiment of this application may further include S1201.

S1201: The electronic device determines whether the quantity of layers buffered in the first buffer queue is less than the first preset threshold.

The first preset threshold may be pre-configured in the electronic device. For example, the first preset threshold may be any value such as 1, 2, or 3.

For example, S1201 may include: In response to the VSYNC_SF signal, the render thread of the electronic device reads the quantity of layers buffered in the first buffer queue, and determines whether the quantity of layers buffered in the first buffer queue is less than the first preset threshold.

In a first case, before reading frame data from the first buffer queue in response to the VSYNC_SF signal (that is, the frame data is dequeued from the first buffer queue), the render thread of the electronic device may read the quantity of layers buffered in the first buffer queue, and determine whether the quantity of layers buffered in the first buffer queue is less than the first preset threshold. For example, the first preset threshold may be any value such as 2 or 3.

For example, the first preset threshold is equal to 2. It may be understood that before the frame data is dequeued from the first buffer queue, the quantity of layers buffered in the first buffer queue is less than 2. In this case, after the frame data is dequeued from the first buffer queue, the quantity of layers buffered in the first buffer queue is less than 1. In other words, the quantity of layers buffered in the first buffer queue is 0.

In a second case, after reading frame data from the first buffer queue in response to the VSYNC_SF signal (that is, the frame data is dequeued from the first buffer queue), the render thread of the electronic device may read the quantity of layers buffered in the first buffer queue, and determine whether the quantity of layers buffered in the first buffer queue is less than the first preset threshold. In this case, the first preset threshold may be any value such as 1 or 2.

For example, the first preset threshold is equal to 1. It may be understood that, after the frame data is dequeued from the first buffer queue, if the quantity of layers buffered in the first buffer queue is less than 1, it indicates that the quantity of layers buffered in the first buffer queue is 0.

It may be understood that, when the quantity of layers buffered in the first buffer queue is 0, if the UI thread and the render thread (namely, the producer) cannot complete drawing and rendering within one frame, the frame loss phenomenon occurs when the electronic device displays an image.

Specifically, if the quantity of layers buffered in the first buffer queue (namely, the quantity of frame data buffered in the first buffer queue) is less than the first preset threshold, it indicates that a small quantity of frame data is buffered in the first buffer queue, and there is a high probability that the frame loss occurs when the electronic device displays an image. In this case, as shown in FIG. 12, the electronic device may perform S804 to S807.

If the quantity of layers buffered in the first buffer queue (namely, the quantity of frame data buffered in the first buffer queue) is greater than or equal to the first preset threshold, it indicates that a large quantity of frame data is buffered in the first buffer queue, and there is a low probability that the frame loss occurs when the electronic device displays an image. In this case, as shown in FIG. 12, the electronic device may perform S801 to S803.

In this embodiment of this application, the electronic device may decrease the signal period of the VSYNC_APP signal when there is a high probability that the frame loss occurs when the electronic device displays an image, to reduce the probability that the frame loss occurs when the electronic device displays an image, and ensure smoothness of displaying an image on the display.

Figure 13A:
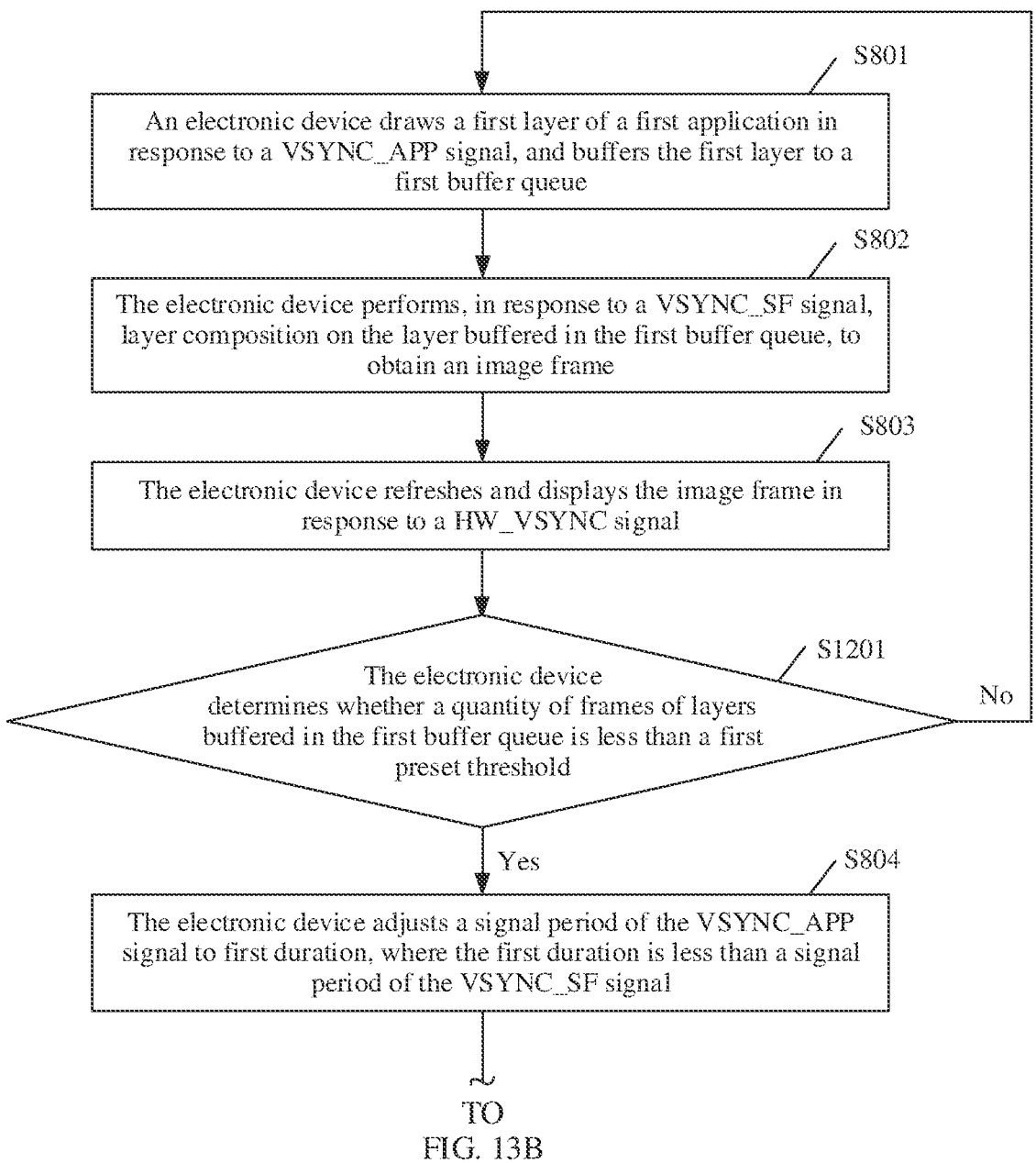
FIG. 13A and FIG. 13B are still another flowchart of a vertical synchronization signal-based control method according to an embodiment of this application.
Figure 13B:
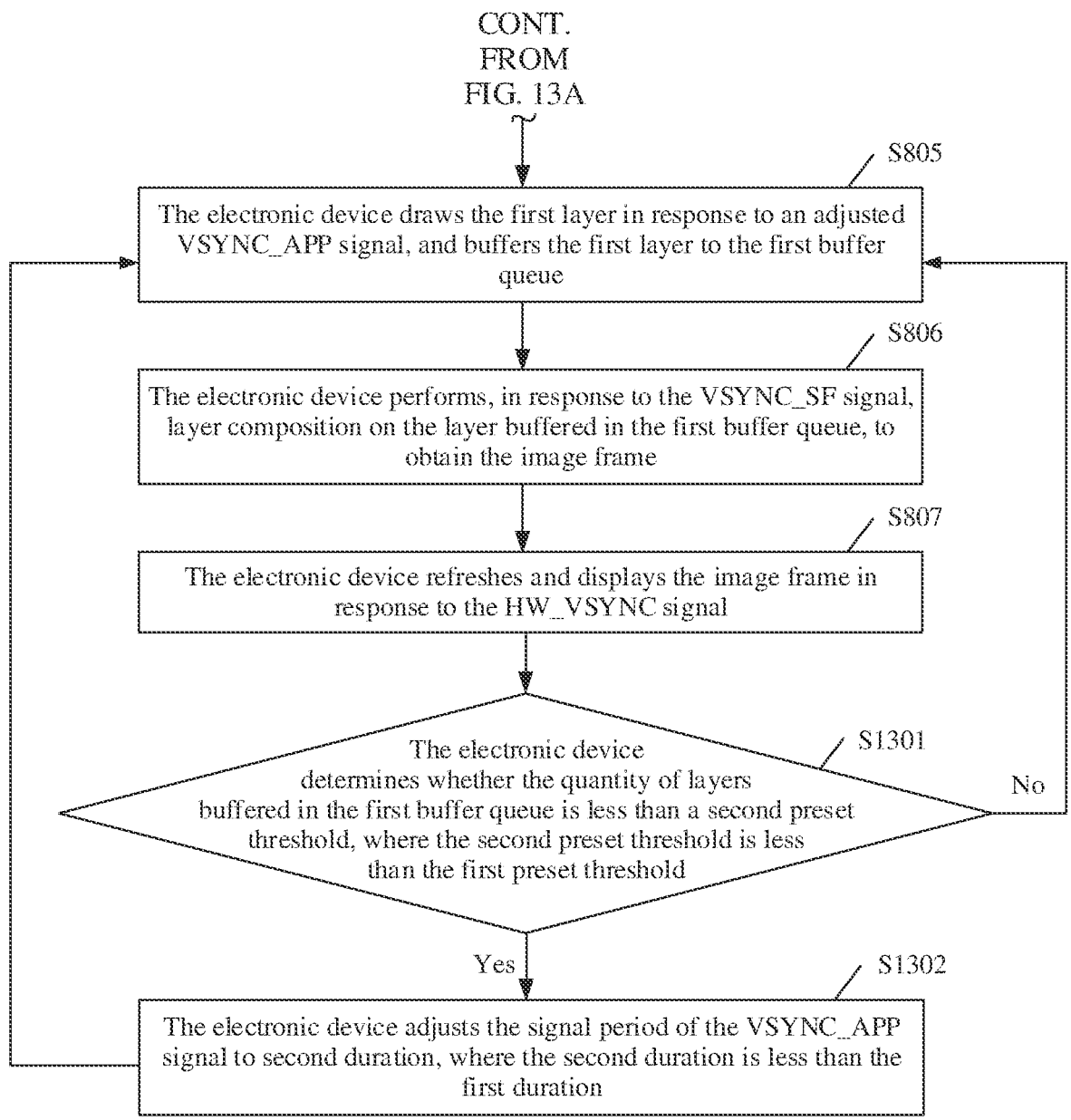

In some other embodiments, after the electronic device performs S804 to adjust the signal period of the VSYNC_APP signal to the first duration, the probability that the frame loss occurs when the electronic device displays an image cannot be reduced. In this case, if the quantity of layers buffered in the first buffer queue is less than a second preset threshold, the electronic device may continue to decrease the signal period of the VSYNC_APP signal, to reduce the probability that the frame loss occurs when the electronic device displays an image. Specifically, after S804, the method in this embodiment of this application may further include S1301 and S1302. For example, as shown in FIG. 13B, after S807, the method in this embodiment of this application may further include S1301 and S1302.

S1301: The electronic device determines whether the quantity of layers buffered in the first buffer queue is less than the second preset threshold. The second preset threshold is less than the first preset threshold.

For example, when the first preset threshold is 2, the second preset threshold may be equal to 1. When the first preset threshold is 3, the second preset threshold may be equal to 1 or 2. Certainly, values of the first preset threshold and the second preset threshold include but are not limited to the foregoing specific values.

It should be noted that for a method for determining, by the electronic device, whether the quantity of layers buffered in the first buffer queue is less than the second preset threshold, refer to the method for determining, by the electronic device, whether the quantity of layers buffered in the first buffer queue is less than the first preset threshold in S1201. Details are not described herein in this embodiment of this application.

Specifically, after S1301, if the quantity of layers buffered in the first buffer queue is less than the second preset threshold, the electronic device may perform S1302. If the quantity of layers buffered in the first buffer queue is greater than or equal to the second preset threshold, the electronic device may perform S805 to S807.

S1302: The electronic device adjusts the signal period of the VSYNC_APP signal to second duration. The second duration is less than the first duration.

For a method for determining the second duration by the electronic device, refer to the method for determining the first duration by the electronic device in the foregoing embodiment. Details are not described herein in this embodiment of this application.

In other words, when the quantity of layers buffered in the first buffer queue is less than the second preset threshold, the electronic device may further decrease the signal period of the VSYNC_APP signal, to reduce the probability that the frame loss occurs when the electronic device displays an image, and ensure smoothness of displaying an image on the display.

Embodiment (5)

Generally, buffer space of the first buffer queue is limited. For example, the first buffer queue may buffer at most two frames of layers (namely, frame data) or three frames of layers (namely, frame data). Therefore, if the signal period of the VSYNC_APP signal is less than the signal period of the VSYNC_SF signal for a long time, a problem that the first buffer queue cannot buffer frame data produced by the UI thread and the render thread (namely, the producer) occurs.

Figure 14A:
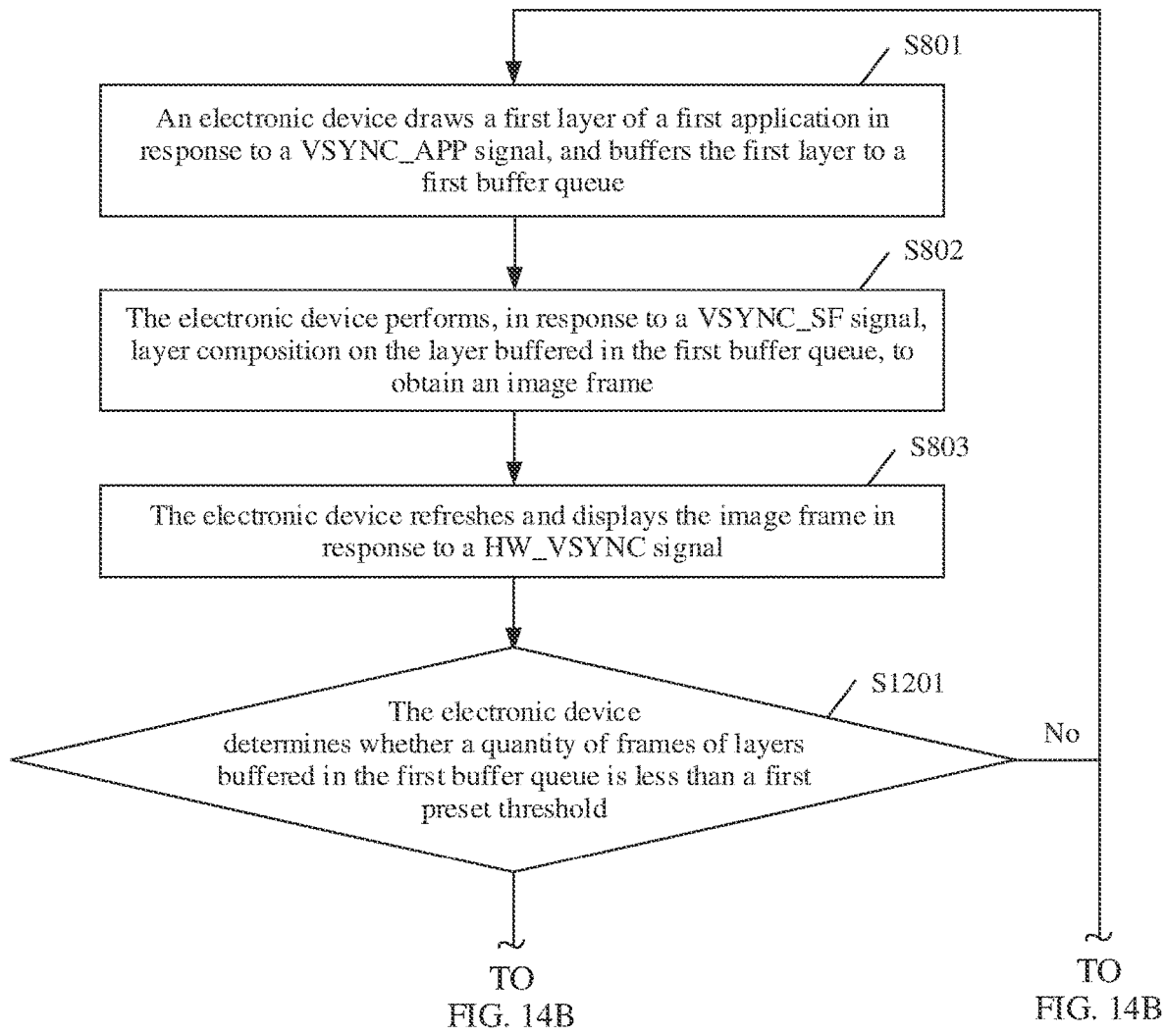
FIG. 14A and FIG. 14B are yet another flowchart of a vertical synchronization signal-based control method according to an embodiment of this application.
Figure 14B:
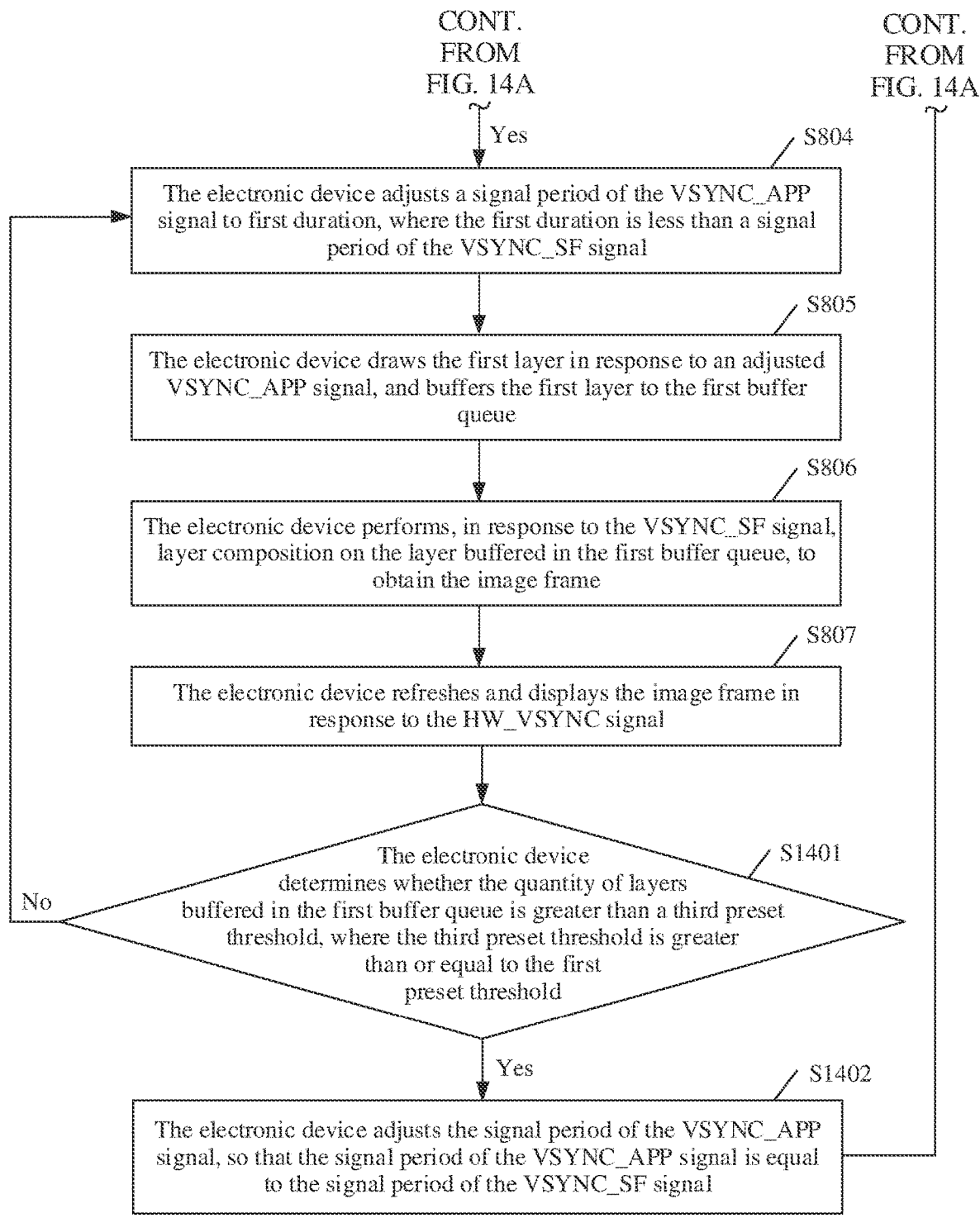

To avoid occurrence of the problem, the electronic device may further adjust the signal period of the VSYNC_APP signal from $T_S'$ to $T_S$ when the quantity of layers buffered in the first buffer queue is greater than a third preset threshold. The method in this embodiment of this application may further include S1401 and S1402. For example, as shown in FIG. 14B, after S804, the method in this embodiment of this application may further include S1401 and S1402.

S1401: The electronic device determines whether the quantity of layers buffered in the first buffer queue is greater than the third preset threshold. The third preset threshold is greater than or equal to the first preset threshold.

The third preset threshold may be pre-configured in the electronic device. For example, the third preset threshold may be any value such as 0, 1, or 2.

For example, S1401 may include: In response to the VSYNC_SF signal, the render thread of the electronic device reads the quantity of layers buffered in the first buffer queue, and determines whether the quantity of layers buffered in the first buffer queue is greater than the third preset threshold.

In a first case, before reading frame data from the first buffer queue in response to the VSYNC_SF signal (that is, the frame data is dequeued from the first buffer queue), the render thread of the electronic device may read the quantity of layers buffered in the first buffer queue, and determine whether the quantity of layers buffered in the first buffer queue is greater than the third preset threshold. In this case, the third preset threshold may be any value such as 1 or 2.

For example, the third preset threshold is equal to 1. It may be understood that before the frame data is dequeued from the first buffer queue, if the quantity of layers buffered in the first buffer queue is greater than 1, it indicates that the quantity of layers buffered in the first buffer queue is at least 2. In this case, after the frame data is dequeued from the first buffer queue, the quantity of layers buffered in the first buffer queue is at least 1.

In a second case, after reading frame data from the first buffer queue in response to the VSYNC_SF signal (that is, the frame data is dequeued from the first buffer queue), the render thread of the electronic device may read the quantity of layers buffered in the first buffer queue, and determine whether the quantity of layers buffered in the first buffer queue is greater than the third preset threshold. In this case, the third preset threshold may be any value such as 0 or 1.

For example, the third preset threshold is equal to 0. It may be understood that, after the frame data is dequeued from the first buffer queue, if the quantity of layers buffered in the first buffer queue is greater than 0, it indicates that the quantity of layers buffered in the first buffer queue is at least 1.

It may be understood that, when the quantity of layers buffered in the first buffer queue is at least 1, if the UI thread and the render thread (namely, the producer) cannot complete drawing and rendering within one frame, the frame loss phenomenon does not occur when the electronic device displays an image.

Specifically, if the quantity of layers buffered in the first buffer queue (namely, the quantity of frame data buffered in the first buffer queue) is greater than the third preset threshold, it indicates that a large quantity of frame data is buffered in the first buffer queue, and there is a low probability that the frame loss occurs when the electronic device displays an image. In this case, as shown in FIG. 14A and FIG. 14B, the electronic device may perform S1402 and S801 to S803.

If the quantity of layers buffered in the first buffer queue (namely, the quantity of frame data buffered in the first buffer queue) is less than or equal to the third preset threshold, it indicates that a small quantity of frame data is buffered in the first buffer queue, and there is a high probability that the frame loss occurs when the electronic device displays an image. In this case, as shown in FIG. 14B, the electronic device may continue to perform S805 to S807.

S1402: The electronic device adjusts the signal period of the VSYNC_APP signal, so that the signal period of the VSYNC_APP signal is equal to the signal period of the VSYNC_SF signal.

For example, the electronic device may adjust the signal period of the VSYNC_APP signal from $T_S'$ to $T_S$.

In this embodiment of this application, after sufficient frame data is buffered in the first buffer queue, the electronic device may adjust the signal period of the VSYNC_APP signal from $T_S'$ to $T_S$. In this way, the problem that the first buffer queue cannot buffer the frame data produced by the UI thread and the render thread (namely, the producer) can be avoided.

Embodiment (6)

In this embodiment of this application, an occasion for the electronic device to perform the foregoing method to adjust the signal period of the VSYNC_APP signal is described herein. The electronic device may start to perform the method in response to switching from the first application to the foreground application, to reduce the probability that the frame loss occurs when the electronic device displays an image, and ensure smoothness of displaying an image on the display.

It should be understood that, when the first application is switched to the foreground application, an application interface of the first application is displayed on the display of the electronic device, and is visible to the user. If the frame loss phenomenon occurs when the electronic device performs layer drawing, layer rendering, and image frame composition and display on the first application, smoothness of displaying an image on the display is affected, and user experience is affected. Therefore, when the first application is switched to the foreground application, the electronic device may perform the foregoing method to adjust the signal period of the VSYNC_APP signal, to reduce the probability that the frame loss occurs when the electronic device displays an image.

The foreground application may be an application corresponding to an interface currently displayed on the display of the electronic device. In other words, when an interface of an application is currently displayed on the display of the electronic device, the application is a foreground application.

Alternatively, the foreground application may be that an application applies for a new activity (startActivity) through an activity manager service (activity manager service, AMS), or an activity in a pause state re-enters an active state.

A software system of the electronic device may use a layered architecture. In the layered architecture, software may be divided into several layers, and each layer has a clear role and task. The layers communicate with each other through a software interface. In some embodiments, the software system of the electronic device is divided into three layers from top to bottom: an application layer (application layer for short), an application framework layer (framework layer for short), and a kernel layer (which is also referred to as a driver layer).

The application layer may include a series of application packages. For example, the application packages may include applications such as Camera, Gallery, Calendar, Phone, Map, Navigation, WLAN, Bluetooth, Music, Videos, Massages, and Launcher (Launcher). The framework layer provides an application programming interface (application programming interface, API) and a programming framework for an application at the application layer. The application framework layer includes some predefined functions. The framework layer may include a window manager service (window manager service, WMS), an activity manager service AMS, and the like.

The window manager service WMS is configured to manage a window program. The window manager service may obtain a size of the display, determine whether there is a status bar, lock the screen, and capture the screen. The activity manager service AMS is responsible for managing activities, starting, switching, and scheduling of components in the system, and managing and scheduling applications. The kernel layer is a layer between hardware and software. The kernel layer includes at least a display driver, a camera driver, an audio driver, and a sensor driver. The kernel layer is a layer between hardware and software.

When the user performs an input operation on the electronic device (for example, an operation of triggering the electronic device to display an application), the kernel layer may generate a corresponding input event (for example, a foldable screen unfolding event) based on the input operation, and report the event to the application framework layer. The activity manager service AMS at the application framework layer sets a window attribute of the application. The window manager service WMS at the application framework layer draws a window based on the setting of the AMS, and then sends window data to the display driver at the kernel layer, so that the display driver displays a corresponding application interface on a foldable screen.

The window attribute may include a location and a size of the activity window, and a visible attribute of the activity window (namely, a status of the activity window). The location of the activity window is a location of the activity window on the display, and the size of the activity window may be width and height information in the application startup config. The visible attribute of the activity window may be true or false. When the visible attribute of the activity window is true, it indicates that the activity window is an active state, and the activity window is visible to the user. In other words, the display driver displays content of the activity window. When the visible attribute of the activity in the activity window is false, it indicates that the activity window is in a pause state, and the activity window is invisible to the user. In other words, the display driver does not display content of the activity window.

The application (for example, an application 1 or an application 2) may invoke an activity startup interface to start a corresponding activity. In response to invocation of the application, the activity manager service AMS may request the window manager service WMS to draw a window corresponding to the activity, and invoke the display driver to implement interface display.

An application that enters an active state may perform the following processing: (1) creating an application object and a context object; (2) invoking Activity.attach( ) to create a window corresponding to an activity; (3) invoking a onCreate method, where a setContentView method in the method is used to create a view DecorView of the activity; and (4) calculating and drawing the view of the activity. After the steps are completed, an image of the application is displayed, and the application is a foreground application.

It should be noted that image content of the foreground application may not only include an image viewed by the user, but also include invisible content on a user interface, content of a transparent layer, or content that is blocked by another application interface and is invisible to the user.

Further, if the foreground application of the electronic device changes, the electronic device may be triggered to perform the foregoing method, to readjust the signal period of the VSYNC_APP signal, so as to reduce the probability that the frame loss occurs when the electronic device displays an image. Specifically, in response to switching the foreground application from the first application to a second application, the electronic device may adjust the signal period of the VSYNC_APP signal to third duration.

The third duration is equal to TS−ΔT2. In an implementation, the third duration is determined based on the second application. The electronic device may set different ΔT2 based on different applications.

In another implementation, the electronic device may determine ΔT2 based on the difference between the signal period $T_X$ ($T_X=T_S$) of the VSYNC_APP signal and the first drawing frame length of the first statistical period. ΔT2 is less than or equal to the difference.

In another implementation, the electronic device may calculate ΔT2 based on a requirement of the user.

In another implementation, the electronic device may determine ΔT2 based on the screen refresh rate of the electronic device. A higher screen refresh rate of the electronic device indicates smaller ΔT2, and a lower screen refresh rate of the electronic device indicates larger ΔT2.

It should be noted that for a specific method for determining ΔT2 by the electronic device, refer to the method for determining ΔT1 in the foregoing embodiment. Details are not described herein in this embodiment of this application.

Embodiment (7)

This embodiment describes application scenarios in which the electronic device performs the method in any one of Embodiment (1) to Embodiment (4). The electronic device performs the method in any one of Embodiment (1) to Embodiment (4) in a list-type sliding scenario, and the method has a definite effect of reducing a probability that a frame loss occurs when the electronic device displays a layer.

It should be understood that the list-type sliding scenario may also be referred to as a continuous sliding scenario. For example, in a scenario, a mobile phone refreshes a mobile phone page in response to the user continuously enters an upward or downward sliding operation on an interface of a "shopping" application. For another example, in a scenario, a mobile phone refreshes a mobile phone page in response to the user continuously enters an upward or downward sliding operation on an interface of an "address book" application. For another example, in a scenario, a mobile phone refreshes a mobile phone page in response to the user continuously enters an upward or downward sliding operation on a contacts interface or a moments interface of an "instant messaging" application. All the scenarios of refreshing the mobile phone page in the foregoing examples may be referred to as list-type sliding scenarios or continuous sliding scenarios.

In the list-type sliding scenario or the continuous sliding scenario, the electronic device may continuously refresh a page. In other words, in the electronic device, the producer continuously produces a plurality of frames of layers, and the consumer continuously consumes a plurality of frames of layers. Therefore, in these application scenarios, by using the method in this embodiment of this application, in a process of continuous layer production and consumption, a production rate of the producer is greater than a consumption rate of the consumer, so that the probability that the frame loss occurs when the electronic device displays an image can be reduced. In the foregoing application scenarios, performing the method in this embodiment of this application has a definite effect of reducing the probability that the frame loss occurs when the electronic device displays a layer.

Embodiment (8)

This embodiment describes a specific method for determining, by the electronic device, that rendering of one or more layers is completed in any embodiment of this application.

In a first application scenario, the one or more layers may be one layer. In a second application scenario, the one or more first layers may include a plurality of layers. In different application scenarios, manners of determining, by the electronic device, that rendering of the one or more layers is completed are different.

In a first application scenario, that rendering of the one or more layers is completed means that rendering of the foregoing one layer is completed.

In a second application scenario, that rendering of the one or more layers is completed means that rendering of a preset layer in the plurality of layers is completed, or rendering of all layers in the plurality of layers is completed. For example, the preset layer may include a layer whose ratio of a layer area to an area of the display is greater than a preset ratio threshold in the plurality of layers.

Embodiment (9)

This embodiment describes a specific manner in which the electronic device adjusts the signal period of the VSYNC_APP signal. It can be learned from the foregoing descriptions of the HW_VSYNC signal, the VSYNC_SF signal, and the VSYNC_APP signal that, the HW_VSYNC signal is a signal triggered by the hardware driver, and the VSYNC_SF signal and the VSYNC_APP signal are generated based on the HW_VSYNC signal. The signal period of the HW_VSYNC signal is equal to the reciprocal of the screen refresh rate of the electronic device. Generally, the VSYNC_SF signal and the VSYNC_APP signal are in a same phase as the HW_VSYNC signal, and the signal periods of the VSYNC_SF signal and the VSYNC_APP signal are equal to the signal period of the HW_VSYNC signal.

Figure 15:
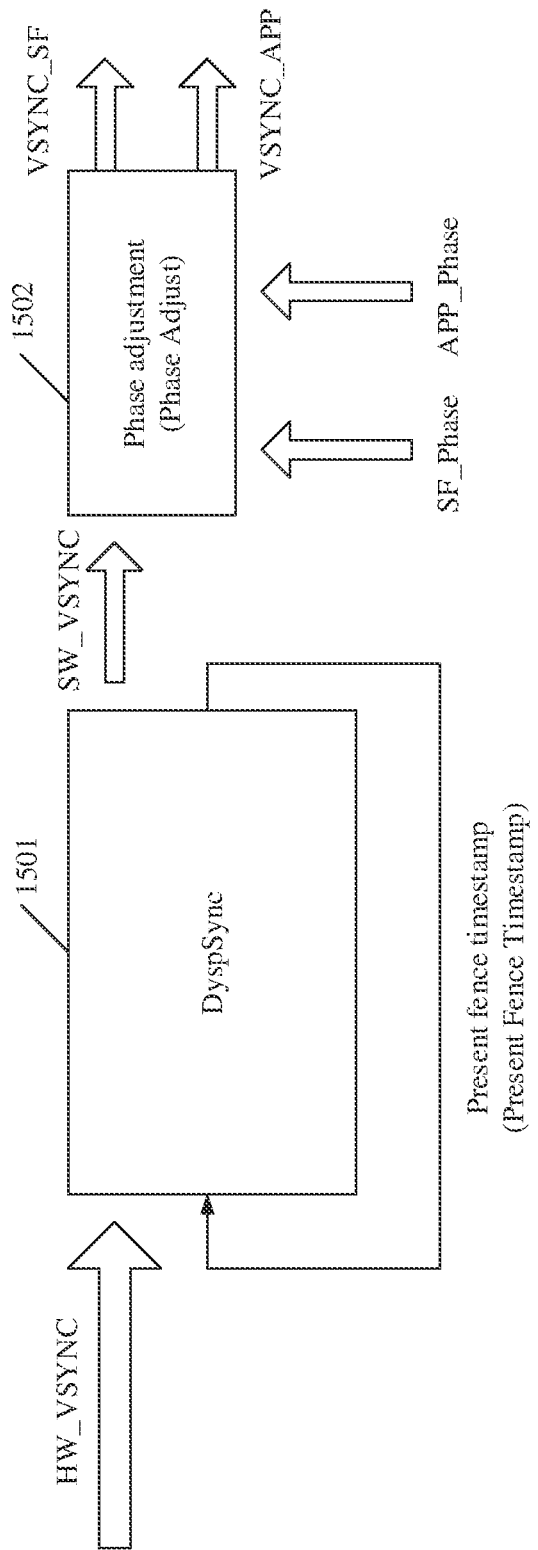
FIG. 15 is a schematic principle diagram of adjusting a VSYNC_APP signal and a VSYNC_SF signal by an electronic device in a solution.

For example, as shown in FIG. 15, an HW_VSYNC signal is used as an input, and an SW_VSYNC signal may be obtained by passing through DyspSync 1501 based on a present fence timestamp (Present Fence Timestamp). The present fence timestamp is a timestamp generated based on the current HW_VSYNC signal (namely, a hardware signal), and is used to record an input time of the current HW_VSYNC signal. The SW_VSYNC signal is a software signal obtained by using the HW_VSYNC signal (namely, the hardware signal) as an input and performing training calculation by the DyspSync module 1501. The SW_VSYNC signal may be used as an intermediate signal to generate the VSYNC_SF signal and the VSYNC_APP signal. The SW_VSYNC signal and the HW_VSYNC signal are in a same phase and have a same signal period. For example, in some current solutions, phase adjustment (Phase Adjust) 1502 may be performed on the SW_VSYNC signal, to obtain the VSYNC_SF signal and the VSYNC_APP signal. A phase difference (SF_Phase) between the VSYNC_SF signal and the SW_VSYNC signal and a phase difference (APP_Phase) between the VSYNC_APP signal and the SW_VSYNC signal may be the same or different. The electronic device may perform phase adjustment (Phase Adjust) 1502 on the SW_VSYNC signal by using SF_Phase, to obtain the VSYNC_SF signal, and perform phase adjustment (Phase Adjust) 1502 on the SW_VSYNC signal by using APP_Phase, to obtain the VSYNC_APP signal.

In one technique, the signal periods of the VSYNC_SF signal and the VSYNC_APP signal are the same as the signal period of the HW_VSYNC signal. When using the processing procedure shown in FIG. 15, the electronic device cannot adjust the signal periods of the VSYNC_SF signal and the VSYNC_APP signal.

Figure 16:
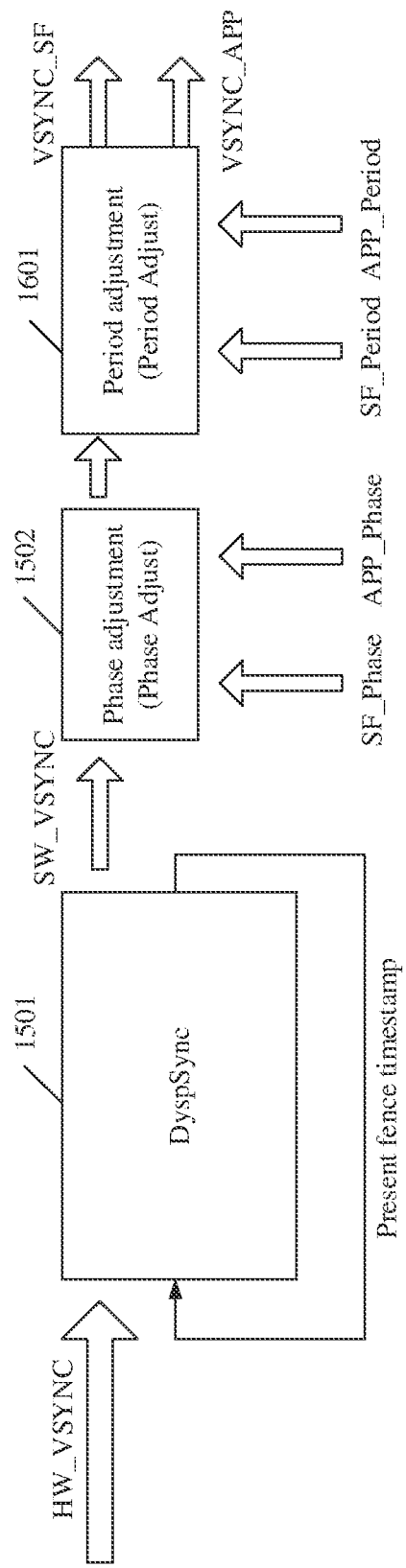
FIG. 16 is a schematic principle diagram of adjusting a VSYNC_APP signal and a VSYNC_SF signal by an electronic device according to an embodiment of this application.

In this embodiment of this application, period adjustment (Period Adjust) 1601 shown in FIG. 16 may be added to the signal processing procedure shown in FIG. 15. As shown in FIG. 16, the electronic device may not only perform phase adjustment (Phase Adjust) 1502 on the SW_VSYNC signal, but also perform period adjustment (Period Adjust) 1601 on the SW_VSYNC signal.

A period difference (SF_Period) between the VSYNC_SF signal and the SW_VSYNC signal and a period difference (APP_Period) between the VSYNC_APP signal and the SW_VSYNC signal may be the same or different. As shown in FIG. 16, the electronic device may perform phase adjustment (Phase Adjust) 1502 on the SW_VSYNC signal by using SF_Phase, and perform period adjustment (Period Adjust) 1601 on the SW_VSYNC signal by using SF_Period, to obtain the VSYNC_SF signal. As shown in FIG. 16, the electronic device may perform phase adjustment (Phase Adjust) 1502 on the SW_VSYNC signal by using APP_Phase, and perform period adjustment (Period Adjust) 1601 on the SW_VSYNC signal by using APP_Period, to obtain the VSYNC_APP signal.

In this embodiment of this application, a period adjustment (Period Adjust) module is added, for example, the period adjustment (Period Adjust) 1601 shown in FIG. 16. In this way, the electronic device may adjust the signal period of the VSYNC_SF signal or the VSYNC_APP signal.

Embodiment (10)

Some embodiments of this application provide an electronic device. The electronic device may include a layer drawing module, a layer rendering module, a layer composition module, a display module, a storage module, and a period adjustment module.

The layer drawing module is configured to support the electronic device in performing the layer drawing operations described in S801 and S805 in the foregoing embodiments, and/or another process of the technology described in this specification. The layer drawing module may be the foregoing UI thread. The layer rendering module is configured to support the electronic device in performing the operation of preparing for rendering a layer and the operation of rendering a layer described in the foregoing embodiments, and/or another process of the technology described in this specification. The layer rendering module may be the foregoing render thread. The layer composition module is configured to support the electronic device in performing S802, S806, S1201, S1301, and S1401 in the foregoing embodiments, and/or another process of the technology described in this specification. The layer composition module may be the foregoing composition thread. The display module is configured to support the electronic device in performing S803 and S807 in the foregoing embodiments, and/or another process of the technology described in this specification. The storage module is configured to store a first buffer queue, and support the electronic device in performing the operation of buffering a first layer into the first buffer queue in S801 and S805, and/or another process of the technology described in this specification. The period adjustment module is configured to support the electronic device in performing S804, S1302, and S1402 in the foregoing embodiments, and/or another process of the technology described in this specification.

Functions of the layer drawing module, the layer rendering module, the layer composition module, and the period adjustment module may be integrated into one processing module for implementation. The processing module may be a processor of the electronic device. The display module may be a display (for example, a touchscreen) of the electronic device. The storage module may be a memory of the electronic device.

Some embodiments of this application provide an electronic device. The electronic device may include a display (for example, a touchscreen), a memory, and one or more processors. The display and the memory are coupled to the processor. The memory is configured to store computer program code, and the computer program code includes computer instructions. When the processor executes the computer instructions, the electronic device may perform functions or steps performed by the electronic device in the foregoing method embodiments. For a structure of the electronic device, refer to the structure of the electronic device 100 shown in FIG. 1.

Figure 17:
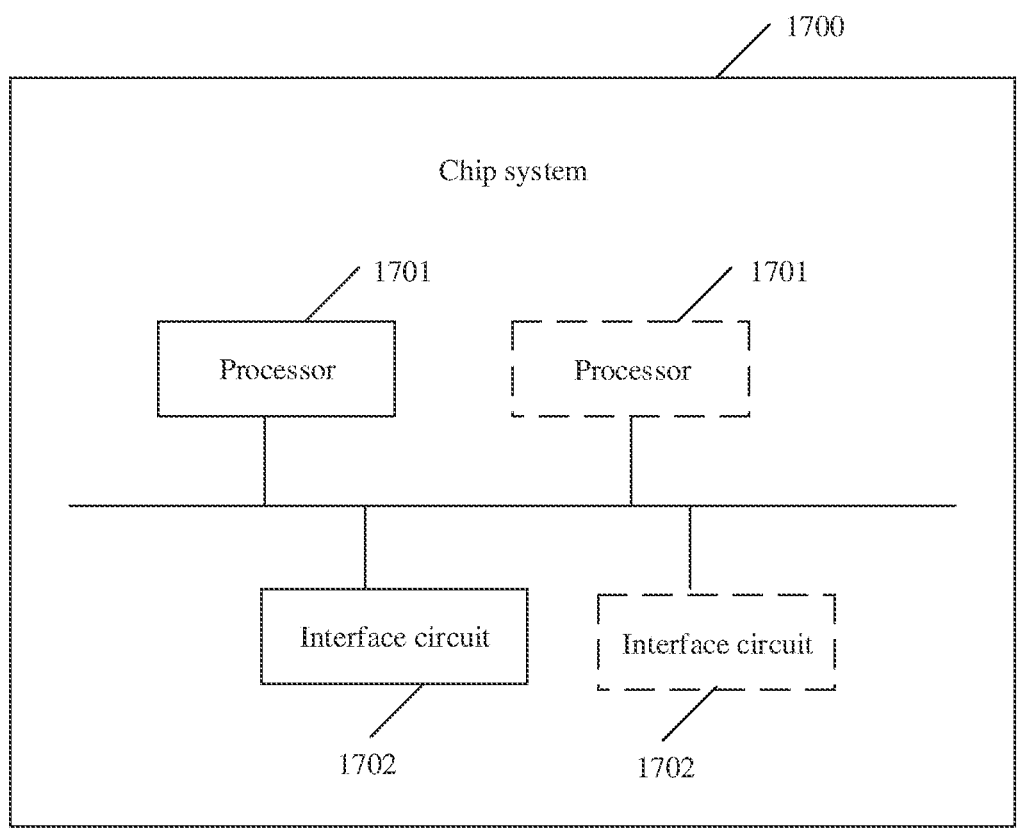
FIG. 17 is a schematic diagram of structural composition of a chip system according to an embodiment of this application.

An embodiment of this application further provides a chip system. As shown in FIG. 17, the chip system 1700 includes at least one processor 1701 and at least one interface circuit 1702. The processor 1701 and the interface circuit 1702 may be interconnected by using a line. For example, the interface circuit 1702 may be configured to receive a signal from another apparatus (for example, a memory of an electronic device). For another example, the interface circuit 1702 may be configured to send a signal to another apparatus (for example, the processor 1701 or a touchscreen of the electronic device). For example, the interface circuit 1702 may read instructions stored in the memory, and send the instructions to the processor 1701. When the instructions are executed by the processor 1701, the electronic device is enabled to perform the steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on the electronic device, the electronic device is enabled to perform the functions or steps performed by the electronic device in the foregoing method embodiments.

An embodiment of this application further provides a computer program product. When the computer program product runs on a computer, the computer is enabled to perform the functions or steps performed by the electronic device in the foregoing method embodiments.

The foregoing descriptions about implementations allow a person skilled in the art to clearly understand that, for convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatuses and methods may be implemented in another manner. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed at different places. Some or all of the units may be selected based on an actual requirement to achieve an objective of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of embodiments of this application. Any variation or replacement within the technical scope disclosed in embodiments of this application shall fall within the protection scope of embodiments of this application. Therefore, the protection scope of this application shall be subject to the protection scope of the claims.

What is claimed is:

1. A vertical synchronization signal-based control method, comprising:
    drawing, by an electronic device, a first layer of a first application in response to a first vertical synchronization signal;
    buffering, by the electronic device, the first layer to a first buffer queue;
    obtaining an image frame by performing, by the electronic device, in response to a second vertical synchronization signal, layer composition on the first layer buffered in the first buffer queue; and
    adjusting, by the electronic device, a signal period of the first vertical synchronization signal to first duration based on a quantity of layers buffered in the first buffer queue being less than a first preset threshold, wherein the first duration is less than a signal period of the second vertical synchronization signal.

2. The method according to claim 1, wherein adjusting, by the electronic device, the signal period of the first vertical synchronization signal to the first duration based on the quantity of layers buffered in the first buffer queue being less than the first preset threshold comprises:
    in response to switching from the first application to a foreground application, adjusting, by the electronic device, the signal period of the first vertical synchronization signal to the first duration based on the quantity of layers buffered in the first buffer queue being less than the first preset threshold; and
    wherein the first buffer queue is allocated to the first application, and the foreground application is an application corresponding to an interface currently displayed on a display of the electronic device.

3. The method according to claim 1, wherein the method further comprises:
    adjusting, by the electronic device, based on the quantity of layers buffered in the first buffer queue being less than a second preset threshold, the signal period of the first vertical synchronization signal to second duration; and
    wherein the second preset threshold is less than the first preset threshold, and the second duration is less than the first duration.

4. The method according to claim 1, wherein the method further comprises:
    adjusting, by the electronic device, based on the quantity of layers buffered in the first buffer queue being greater than a third preset threshold, the signal period of the first vertical synchronization signal, wherein the signal period of the first vertical synchronization signal is equal to the signal period of the second vertical synchronization signal, and wherein
    the third preset threshold is greater than or equal to the first preset threshold.

5. The method according to claim 4, wherein that the quantity of layers buffered in the first buffer queue is greater than the third preset threshold comprises one of:
    reading, by the electronic device, before performing, in response to the second vertical synchronization signal, layer composition on the layer buffered in the first buffer queue, the quantity of layers buffered in the first buffer queue, wherein the read quantity is greater than the third preset threshold; or
    reading, by the electronic device, after performing layer composition on a frame of layer at a queue head in the first buffer queue in response to the second vertical synchronization signal, the quantity of layers buffered in the first buffer queue, wherein the read quantity is greater than the third preset threshold.

6. The method according to claim 1, wherein adjusting, by the electronic device, the signal period of the first vertical synchronization signal to the first duration comprises:
    decreasing, by the electronic device, the signal period of the first vertical synchronization signal by $\Delta T$, wherein the signal period of the first vertical synchronization signal is equal to the first duration, wherein the first duration is less than the signal period of the second vertical synchronization signal; and
    wherein $\Delta T$ is a fixed duration pre-configured in the electronic device.

7. The method according to claim 1, wherein the method further comprises:
    adjusting, by the electronic device, in response to switching a foreground application from the first application to a second application, the signal period of the first vertical synchronization signal to third duration.

8. The method according to claim 1, wherein that the quantity of layers buffered in the first buffer queue is less than the first preset threshold comprises one of:
  reading, by the electronic device, before performing, in response to the second vertical synchronization signal, layer composition on the layer buffered in the first buffer queue, the quantity of layers buffered in the first buffer queue, wherein the read quantity is less than the first preset threshold; or
  reading, by the electronic device, after performing, in response to the second vertical synchronization signal, layer composition on the layer buffered in the first buffer queue, the quantity of layers buffered in the first buffer queue, wherein the read quantity is less than the first preset threshold.

9. The method according to claim 1, wherein adjusting, by the electronic device, the signal period of the first vertical synchronization signal to the first duration comprises:
  decreasing, by the electronic device, the signal period of the first vertical synchronization signal by $\Delta T$, wherein the signal period of the first vertical synchronization signal is equal to the first duration, wherein the first duration is less than the signal period of the second vertical synchronization signal; and
  wherein $\Delta T$ is determined based on a difference between the signal period of the second vertical synchronization signal and a first drawing frame length of a first statistical period, the first drawing frame length is a duration required by the electronic device to draw a layer, and $\Delta T$ is less than or equal to the difference.

10. The method according to claim 1, wherein adjusting, by the electronic device, the signal period of the first vertical synchronization signal to the first duration comprises:
  decreasing, by the electronic device, the signal period of the first vertical synchronization signal by $\Delta T$, wherein the signal period of the first vertical synchronization signal is equal to the first duration, wherein the first duration is less than the signal period of the second vertical synchronization signal; and
  wherein $\Delta T$ is determined based on a preset quantity K set by a user, wherein the preset quantity K indicates that the user expects the electronic device to resolve a frame loss of one frame after K frames, $\Delta T = T_S/(K+1)$, and $T_S$ is a reciprocal of a screen refresh rate of the electronic device.

11. The method according to claim 1, wherein adjusting, by the electronic device, the signal period of the first vertical synchronization signal to the first duration comprises:
  decreasing, by the electronic device, the signal period of the first vertical synchronization signal by $\Delta T$, wherein the signal period of the first vertical synchronization signal is equal to the first duration, wherein the first duration is less than the signal period of the second vertical synchronization signal; and
  wherein $\Delta T$ is determined based on a screen refresh rate of the electronic device, a higher screen refresh rate indicates smaller $\Delta T$, and a lower screen refresh rate indicates larger $\Delta T$.

12. An electronic device, comprising:
  a display;
  one or more processors; and
  a non-transitory computer-readable storage medium storing a program to be executed by the one or more processors, the program including instructions for:
    drawing a first layer of a first application in response to a first vertical synchronization signal;
    buffering the first layer to a first buffer queue;
    obtaining an image frame by performing, in response to a second vertical synchronization signal, layer composition on the first layer buffered in the first buffer queue; and
    adjusting a signal period of the first vertical synchronization signal to first duration based on a quantity of layers buffered in the first buffer queue being less than a first preset threshold, wherein the first duration is less than a signal period of the second vertical synchronization signal.

13. The electronic device according to claim 12, wherein adjusting the signal period of the first vertical synchronization signal to the first duration based on the quantity of layers buffered in the first buffer queue being less than the first preset threshold comprises:
  in response to switching from the first application to a foreground application, adjusting the signal period of the first vertical synchronization signal to the first duration based on the quantity of layers buffered in the first buffer queue being less than the first preset threshold; and
  wherein the first buffer queue is allocated to the first application, and the foreground application is an application corresponding to an interface currently displayed on a display of the electronic device.

14. The electronic device according to claim 12, wherein the instructions further comprise instructions for:
  adjusting, based on the quantity of layers buffered in the first buffer queue being less than a second preset threshold, the signal period of the first vertical synchronization signal to second duration; and
  wherein the second preset threshold is less than the first preset threshold, and the second duration is less than the first duration.

15. The electronic device according to claim 12, wherein the instructions further comprise instructions for:
  adjusting, based on the quantity of layers buffered in the first buffer queue being greater than a third preset threshold, the signal period of the first vertical synchronization signal, wherein the signal period of the first vertical synchronization signal is equal to the signal period of the second vertical synchronization signal, and wherein the third preset threshold is greater than or equal to the first preset threshold.

16. The electronic device according to claim 15, wherein that the quantity of layers buffered in the first buffer queue is greater than the third preset threshold comprises one of:
  reading, before performing, in response to the second vertical synchronization signal, layer composition on the layer buffered in the first buffer queue, the quantity of layers buffered in the first buffer queue, wherein the read quantity is greater than the third preset threshold; or
  reading, after performing layer composition on a frame of layer at a queue head in the first buffer queue in response to the second vertical synchronization signal, the quantity of layers buffered in the first buffer queue, wherein the read quantity is greater than the third preset threshold.

17. The electronic device according to claim 12, wherein adjusting the signal period of the first vertical synchronization signal to the first duration comprises:
  decreasing the signal period of the first vertical synchronization signal by $\Delta T$, wherein the signal period of the first vertical synchronization signal is equal to the first duration, wherein the first duration is less than the signal period of the second vertical synchronization signal; and wherein one of:

ΔT is a fixed duration pre-configured in the electronic device;

ΔT is determined based on a difference between the signal period of the second vertical synchronization signal and a first drawing frame length of a first statistical period, the first drawing frame length is duration required by the electronic device to draw a layer, and ΔT is less than or equal to the difference;

ΔT is determined based on a preset quantity K set by a user, wherein the preset quantity K indicates that the user expects the electronic device to resolve a frame loss of one frame after K frames, $\Delta T = T_S/(K+1)$, and $T_S$ is a reciprocal of a screen refresh rate of the electronic device; or ΔT is determined based on a screen refresh rate of the electronic device, a higher screen refresh rate indicates smaller ΔT, and a lower screen refresh rate indicates larger ΔT.

18. The electronic device according to claim 12, wherein the instructions further comprise instructions for:

adjusting, in response to switching a foreground application from the first application to a second application, the signal period of the first vertical synchronization signal to third duration.

19. The electronic device according to claim 12, wherein that the quantity of layers buffered in the first buffer queue is less than the first preset threshold comprises one of:

reading, before performing, in response to the second vertical synchronization signal, layer composition on the layer buffered in the first buffer queue, the quantity of layers buffered in the first buffer queue, wherein the read quantity is less than the first preset threshold; or reading, after performing, in response to the second vertical synchronization signal, layer composition on the layer buffered in the first buffer queue, the quantity of layers buffered in the first buffer queue, wherein the read quantity is less than the first preset threshold.

20. A non-transitory computer-readable storage medium storing a program to be executed by one or more processors, the program including instructions for:

drawing a first layer of a first application in response to a first vertical synchronization signal;

buffering the first layer to a first buffer queue;

obtaining an image frame by performing, in response to a second vertical synchronization signal, layer composition on the first layer buffered in the first buffer queue; and adjusting a signal period of the first vertical synchronization signal to first duration based on a quantity of layers buffered in the first buffer queue being less than a first preset threshold, wherein the first duration is less than a signal period of the second vertical synchronization signal.

* * * * *